US008130230B2

(12) United States Patent
Eriguchi et al.

(10) Patent No.: US 8,130,230 B2

(45) Date of Patent: Mar. 6, 2012

(54) DISPLAY DEVICE

(75) Inventors: Takuya Eriguchi, Yokosuka (JP); Norio Mamba, Kawasaki (JP); Hiroshi Kurihara, Mobara (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 976 days.

(21) Appl. No.: 12/081,516

(22) Filed: Apr. 17, 2008

(65) Prior Publication Data

US 2008/0259088 A1 Oct. 23, 2008

(30) Foreign Application Priority Data

Apr. 23, 2007 (JP) ................................ 2007-113294

(51) Int. Cl.
*G09G 5/36* (2006.01)
*G09G 3/36* (2006.01)
*G06F 3/038* (2006.01)

(52) U.S. Cl. ......... 345/545; 345/560; 345/100; 345/204

(58) Field of Classification Search .................. 345/545, 345/560, 100, 204
See application file for complete search history.

(56) References Cited

U.S. PATENT DOCUMENTS 5,912,713 A * 6/1999 Tsunoda et al. .............. 345/213
6,756,955 B2 6/2004 Someya et al.
2005/0001932 A1* 1/2005 Masuda et al. ................ 348/563

* cited by examiner

*Primary Examiner* — Hau Nguyen

(74) *Attorney, Agent, or Firm* — Antonelli, Terry, Stout & Kraus, LLP.

(57) ABSTRACT

Disclosed herein is a display device in which input data is written to a RAM as current frame data and read from the RAM as preceding frame data. Then, the current frame data and the preceding frame data are added up in a correction circuit and the result is subjected to an overdriving processing. After this, the processed (over-driven) data is assumed as current frame corrected data, which is then written to the RAM. The written corrected data is read from the RAM and subjected to a double-speed driving processing.

7 Claims, 31 Drawing Sheets

FIG.2

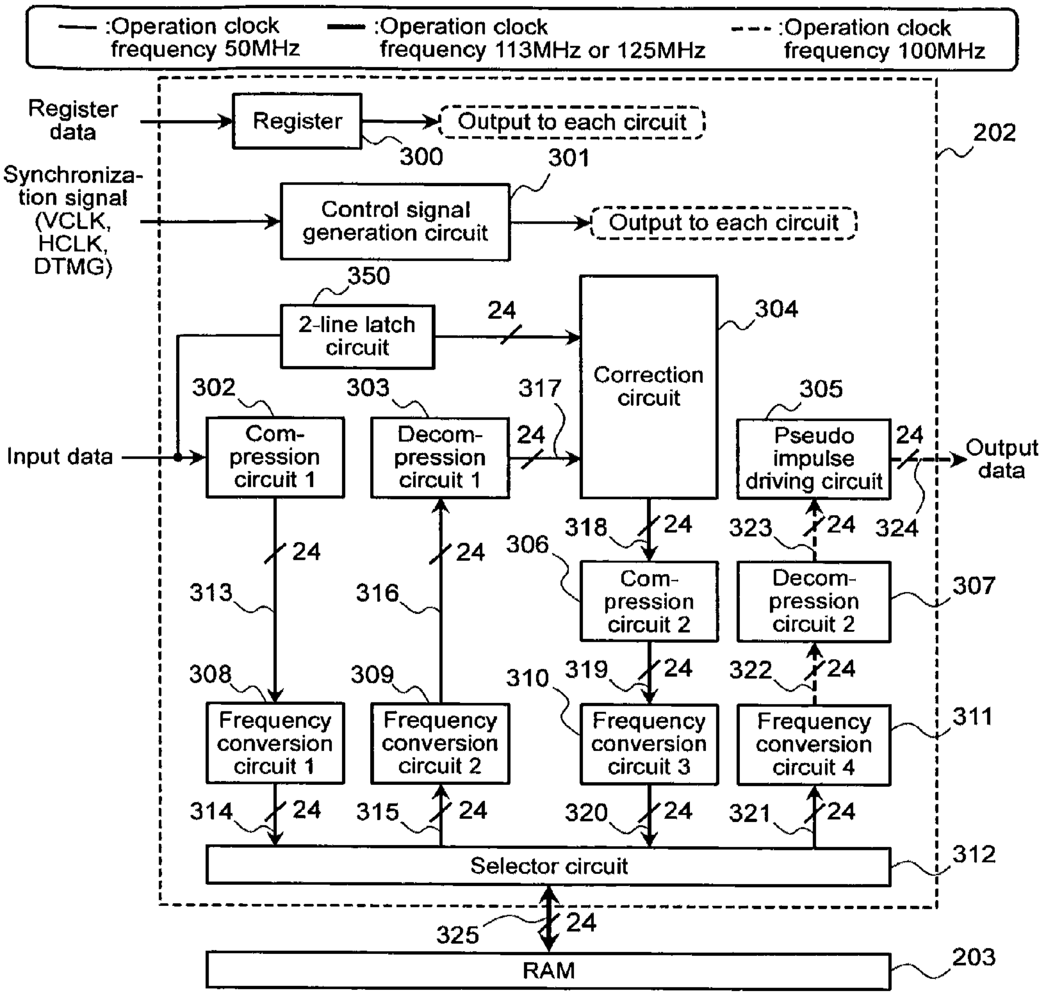

RAM data bus operation clock frequency (compression by two lines)

| 0.75 | × | 3 | × | 50MHz | ≒ | 113MHz |
|---|---|---|---|---|---|---|
| Data compression rate (72bits/96bits) | | R/W operations per 1H period | | Input operation clock frequency | | |

RAM data bus operation clock frequency (compression by single line)

| 0.5 | × | 5 | × | 50MHz | = | 125MHz |
|---|---|---|---|---|---|---|
| Data compression rate (48bits/96bits) | | R/W operations per 1H period | | Input operation clock frequency | | |

RAM data bus operation clock frequency (compression by two lines/by single line)

| (0.75 | × | 1 | + | 0.5 | × | 3 | ) × | 50MHz | ≒ | 113MHz |
|---|---|---|---|---|---|---|---|---|---|---|
| Data compression rate | | R/W operations for display data per 1H period | | Data compression rate | | R/W operations for corrected data per 1H period | | Input operation clock frequency | | |

1H period at resolution XGA (1024 × 768)

- Input 1H period = (1024 + 61 (Horizontal retrace time)) × (1/50MHz) = 21.7 μs
- RAM read/write access period = (1024 × 0.75 (Display data compression rate) + 30 (Read/write command issuing period)) × 3 (Number of read/write operations) × (1/113MHz) ≒ 21.2 μs 1H period at resolution XGA (1024 × 768)

- Input 1H period = (1024 + 61 (Horizontal retrace time)) × (1/50MHz) = 21.7 μs
- RAM read/write access period = (1024×0.5 (Display data compression rate) + 30 (Read/write command issuing period)) × 6 (Number of read/write operations) × (1/150MHz) ≒ 21.7 μs 1H time at resolution XGA (1024 × 768)

- Input 1H period = (1024 + 61 (Horizontal retrace time)) × (1/50MHz) = 21.7 μs
- RAM read/write access period
  = ((1024 × 0.5 (Display data compression rate) + 30 (Read/write command issuing period)) × 2 (Number of read/write accesses) + (1024 − 30 (Read/write command issuing period)) × 2 (Number of read/write accesses)) × (1/150MHz)
  ≒ 21.3 μs

DISPLAY DEVICE

CLAIM OF PRIORITY

The present application claims priority from Japanese application serial No. 2007-113294 filed on Apr. 23, 2007, the content of which is hereby incorporated by reference into this application.

BACKGROUND OF THE INVENTION

1. Field of the Invention

The present invention relates to a display device improved to suppress the blur to appear in motion pictures, particularly to a technique capable of improving the response speed of motion pictures in each liquid crystal display device.

2. Description of Related Art

Conventional liquid crystal display devices have been confronted with a problem of the blur, respectively. In order to solve the problem, the U.S. Pat. No. 6,756,955 (JP-A No. 2003-202845) discloses a liquid crystal display device that reduces the capacity of a delaying means (storage) by encoding image data to be inputted to the delaying means (storage). The delaying means (storage) carries out a period delay processing by one frame in the process of over-driving required to improve the response speed of motion pictures.

There is another well-known technique, which is referred to as a double-speed driving processing. According to the technique, one frame is divided into two sub-frames (light and dark sub-frames) with use of a storage, thereby improving the response speed of motion pictures.

If both the over-driving processing and the double-speed driving processing are to be carried out simultaneously so as to suppress the blur to appear in motion pictures as described above, two storages are required; one is used for the over-driving processing and the other is used for the double-speed driving processing.

SUMMARY OF THE INVENTION

Under such circumstances, it is an object of the present invention to provide a display device capable of those over-driving and double-speed driving processings with use of only one storage.

In order to solve the conventional problem as described above, the display device of the present invention includes an image processing circuit, which makes at least four or more write/read accesses to one storage (RAM) that stores input data. The image processing circuit is characterized by outputting corrected data within one line period (1H period or one horizontal period). The data to be written to this RAM is input data and corrected data included in the current frame while the data to be read from this RAM is input data and corrected data included in the preceding frame.

According to the present invention, therefore, the following four effects (1) to (4) are assured.

(1) Because only one RAM is required for carrying out both over-driving and double-speed driving processings, the manufacturing cost is reduced.

(2) Because only one RAM is used, the number of I/O pins is reduced, thereby the chip is also reduced in size. As a result, both the manufacturing cost and the packaging area are reduced.

(3) In addition to the manufacturing cost reduction, the display quality can be improved.

(4) The present invention can apply not only to the impulse type display device that carries out the double-speed driving processing, but also to the hold type display device.

BRIEF DESCRIPTION OF THE DRAWINGS

FIG. 2 is a configuration of an image processing circuit 202 shown in FIG. 1;

DETAILED DESCRIPTION OF THE PREFERRED EMBODIMENTS

Hereunder, the preferred embodiments of the present invention will be described with reference to the accompanying drawings.

First Embodiment

Figure 1A:
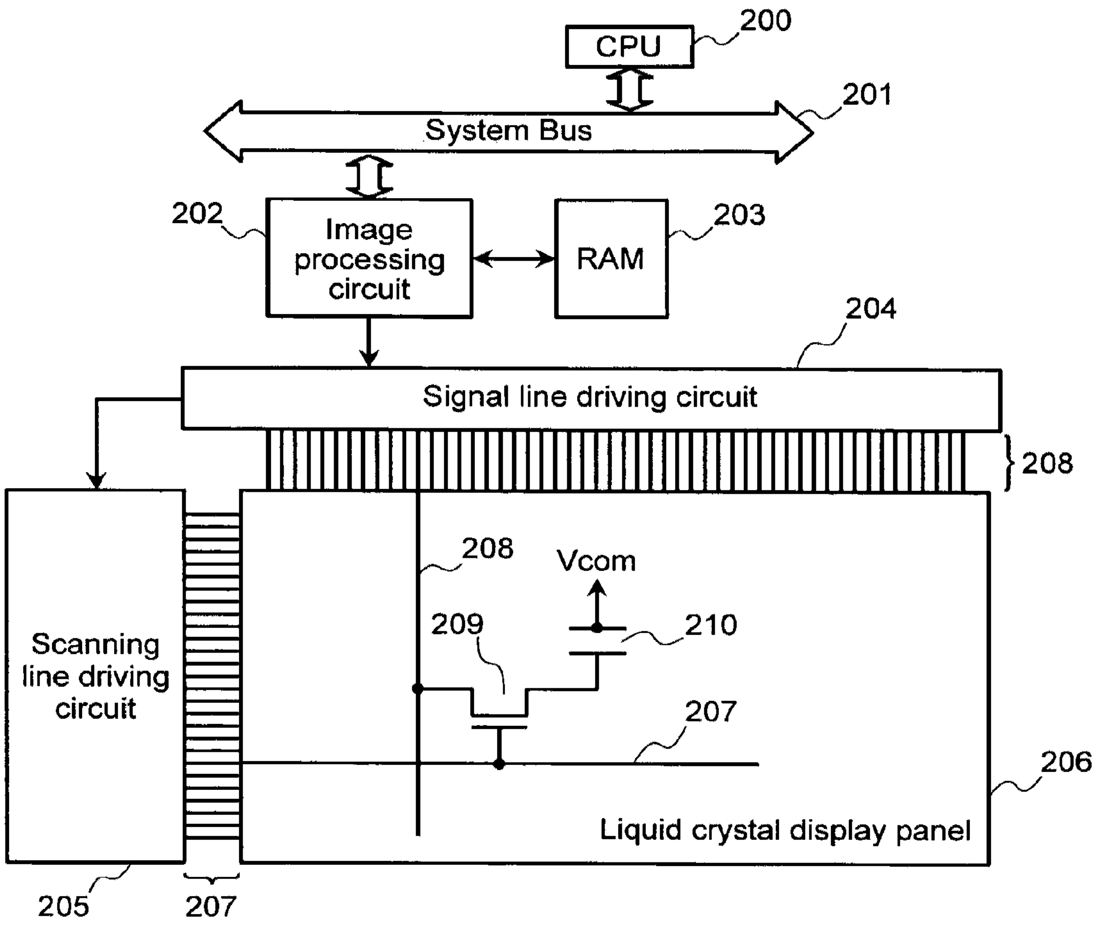
FIG. 1 is a schematic block diagram of a display device of the present invention.
Figure 1B:
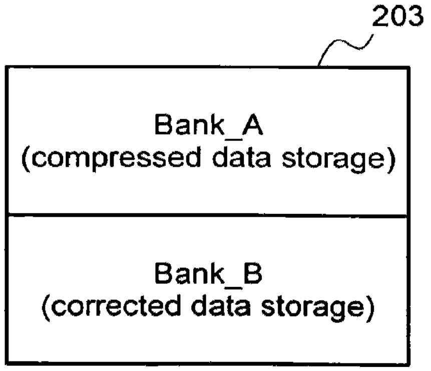

FIG. 1A is a schematic block diagram of the display device of the present invention and FIG. 1B is a configuration of a storage (RAM) 203 shown in FIG. 1A with respect to a memory area (Bank_A) used to store compressed data and another memory area (Bank_B) used to store corrected data.

In FIG. 1A, input data, synchronization signals, and register data are supplied from an external CPU 200 to an image processing circuit 202 through a system bus 201. The image processing circuit 202 reads/writes input data through an I/O data bus 325 with use of the RAM 203 and carries out both of an over-driving processing and a double-speed driving processing for the input data, then supplies the processed data to a signal line driving circuit 204 as output data 324.

The signal line driving circuit 204 supplies the synchronization signals to the scanning line driving circuit 205 and applies data signals to the signal lines 208 of the liquid crystal display panel 206. The scanning line driving circuit 205 applies the synchronization signals to scanning lines 207 of the liquid crystal display panel 206 according to the synchronization signals, respectively. A thin film transistor (TFT) 209 is connected to each intersection between a plurality of scanning lines 207 and a plurality of signal lines 208 used to drive liquid crystal elements 210, respectively. The other electrode of each liquid crystal element 210 is connected to Vcom.

In FIG. 1B, the memory area (Bank_A) of the RAM 203 stores compressed input data and the memory area (Bank_B) thereof stores corrected data that has been subjected to an over-driving processing in the image processing circuit 202.

Figure 3:
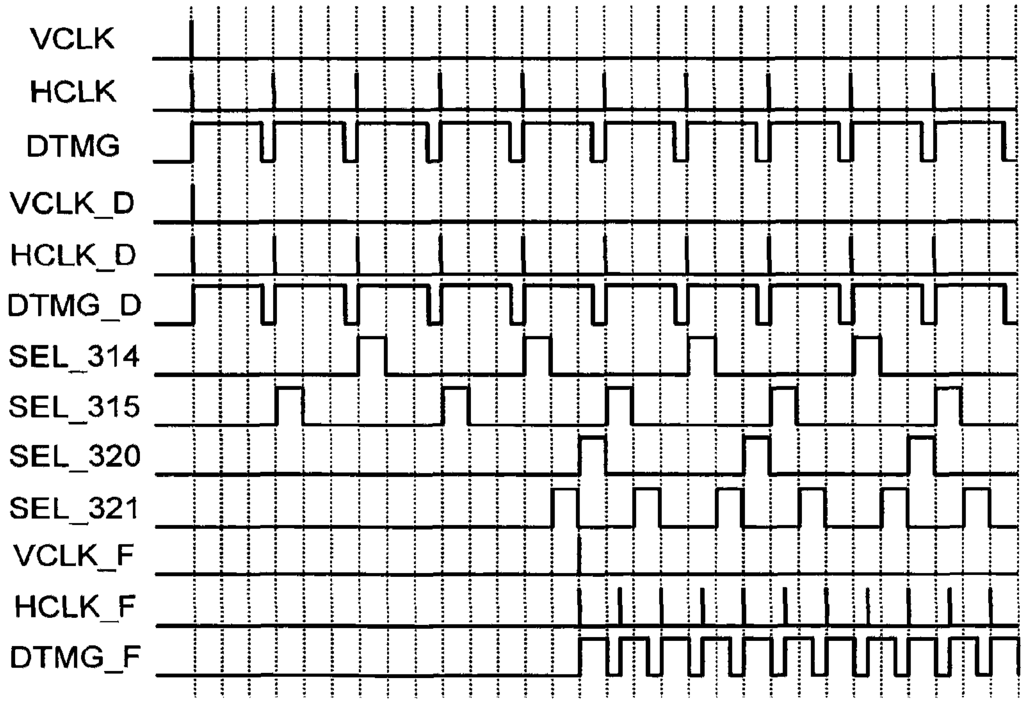
FIG. 3 is a timing chart of the signals generated by a control signal generation circuit 301 shown in FIG. 2, which divides the one H period into three sub-periods to generate those signals.

FIG. 2 shows a configuration of the image processing circuit 202 shown in FIG. 1. In FIG. 2, the resister data received from the CPU 200 shown in FIG. 1 is held in the register 300, then output to each circuit. Each circuit is turned on/off according to the inputted resister data. A control signal generation circuit 301 outputs the read/write timing signals (VCLK_D, HCLK_D, and DTMG_D) to each circuit according to the synchronization signals (VCLK, HCLK, and DTMG), respectively as shown in FIG. 3.

Input data is compressed in the compression circuit 1 (302), then its frequency is converted in the frequency conversion circuit 1 (308). After that, the input data is transferred to the RAM through a selector circuit 312 and stored therein. The preceding frame converted data, stored in the RAM 203, is transferred to the frequency conversion circuit 2 (309) through the selector circuit 312 and its frequency is converted therein. After that, the data is decompressed in a decompression circuit 1 (303) and inputted to a correction circuit 304. This correction circuit 304 inputs data through a 2-line latch circuit 350. The compression circuit 1 (302) includes a line memory.

The operation clock frequency is the same (50 MHz) among the input data, the output data of the compression circuit 1 (302), and the input/output data of the decompression circuit 1 (303). The operation clock frequency is also the same (113 MHz) among the output data 314 of the frequency conversion circuit 1 (308), the input data 315 to the frequency conversion circuit 2 (309), and the input/output data bus 325 of the RAM 203. Each data is 24 bits in total length and consists of red (R) data (8 bits), green (G) data (8 bits), and blue (B) data (8 bits).

The correction circuit 304 outputs corrected data 318 that has been subjected to an over-driving processing with use of the 2-line latched data of the current frame output from the 2-line latch circuit 350 and the decompressed data of the current frame output from the decompression circuit 1 (303). This corrected data 318 is compressed in the compression circuit 2 (306), then its frequency is converted in the frequency conversion circuit 3 (310). After that, the data is transferred to the RAM 203 through the selector circuit 312 and stored therein. The corrected data of the preceding frame, stored in the RAM 203, is transferred to the frequency conversion circuit 4 (311) through the selector circuit 312 and its frequency is converted therein, then decompressed in the decompression circuit 2 (307) and inputted to a pseudo impulse driving circuit 305. The pseudo impulse driving circuit 305 outputs data that has been subjected to a double-speed driving processing as output data 324. The compression circuit 2 includes a line memory.

The operation clock frequency (50 MHz) is the same between the output data 318 of the correction circuit 304 and the output data 319 of the compression circuit 2 (306). The operation clock frequency (113 MHz) is also the same between the output data 320 of the frequency conversion circuit 3 (310) and the input data 321 to the frequency conversion circuit 4 (311). Furthermore, the operation clock frequency (100 MHz) is the same between the input data 322 to the decompression circuit 2 (307) and the input/output data 323 and 324 of the pseudo impulse driving circuit 305. Each data is 24 bits in total length and consists of red (R) data (8 bits), green (G) (8 bits), and blue (B) (8 bits).

FIG. 3 shows a timing chart of the signals generated from the control signal generation circuit 301 shown in FIG. 2. The circuit 301 generates those signals by dividing 1H period into three sub-periods. In FIG. 3, the control signal generation circuit 301 generates the read/write timing signals (VCLK_D, HCLK_D, and DTMG_D) with respect to the line memories of the compression circuits 1 and 2, the select signals (SEL_314, SEL_314, SEL_320, and SEL_321) of the selector circuit 312, as well as the double-speed driving synchronization signals (VCLK_F, HCLK_F, and DTMG_F) shown in 2 according to the input signals VCLK, HCLK, and DTMG), respectively.

Figure 4:
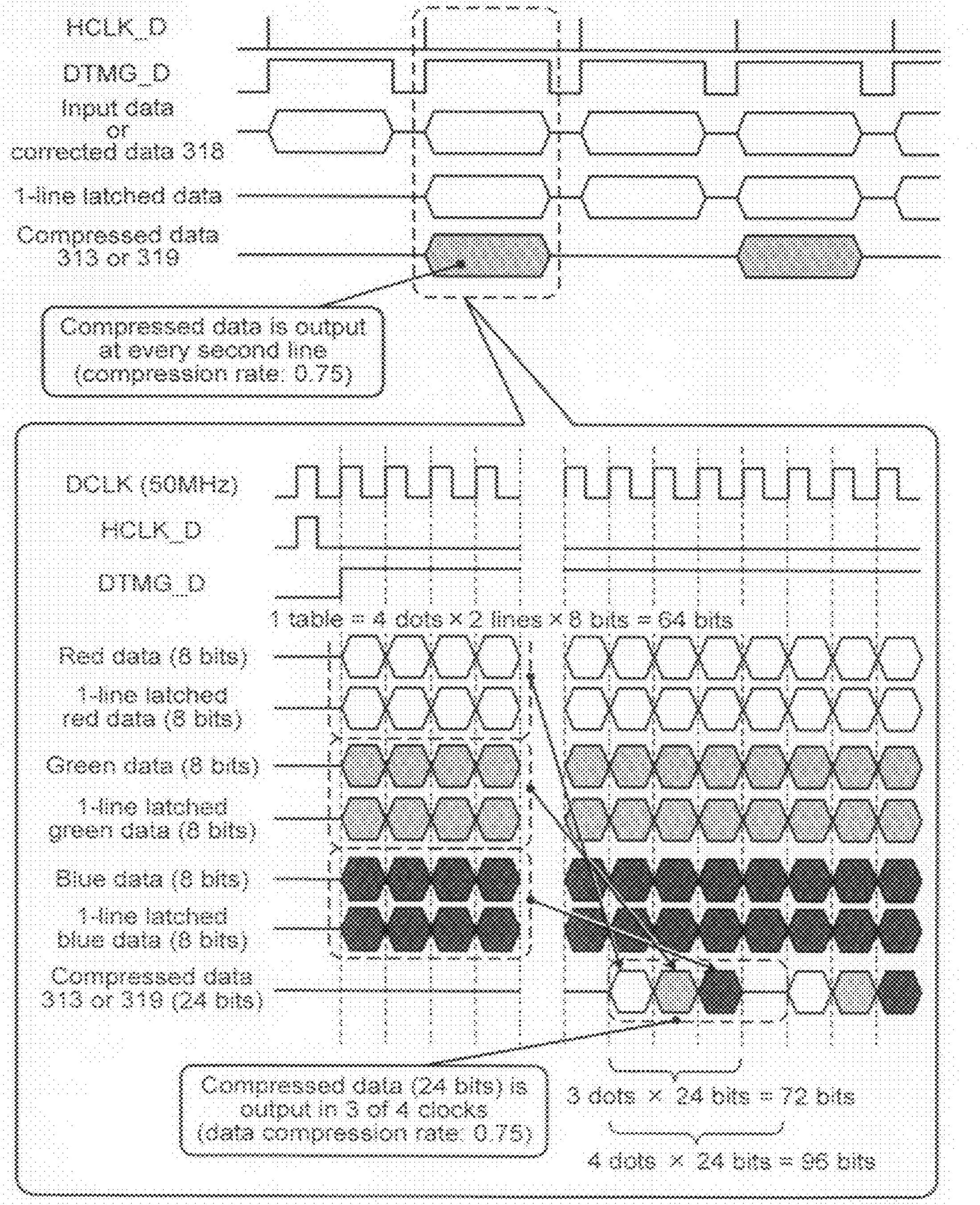
FIG. 4 is a diagram for describing the BTC (Block Truncation Coding) compression method employed for compression circuits 1 and 2 shown in FIG. 2.

FIG. 4 shows a diagram that describes a compression method ((BTC (Block Truncation Coding) method) employed for the compression circuits 1 and 2 shown in FIG. 2. In FIG. 4, the compression circuit 1 compresses input data and one-line latched data that precedes by one line synchronously with the read/write timing signal (HCLK_D, DTMG_D) generated in the control signal generation circuit 301 shown in FIG. 2 and outputs compressed data 313 at every second line. Similarly, the compression circuit 2 compresses corrected data 318 and corrected one-line latched data that precedes by one line and outputs compressed data 319 at every second line.

Here, the frequency of the operation clock DCLK is set at 50 MHz and each of the R (red) data, G (green) data, and B (blue) data is put together with each one-line latched data that precedes by one line synchronously with the read/write timing signal (HCLK_D, DTMG_D), then compressed into one table (4 dots×2 lines×8 bits (64 bits). The compressed data 313/319 is output in three (3×24 bits=72 bits) of the four clocks (4×24 bits=96 bits) of the operation clock DCLK, so that the data compression rate becomes 72 bits/96 bits=0.75.

Figure 5:
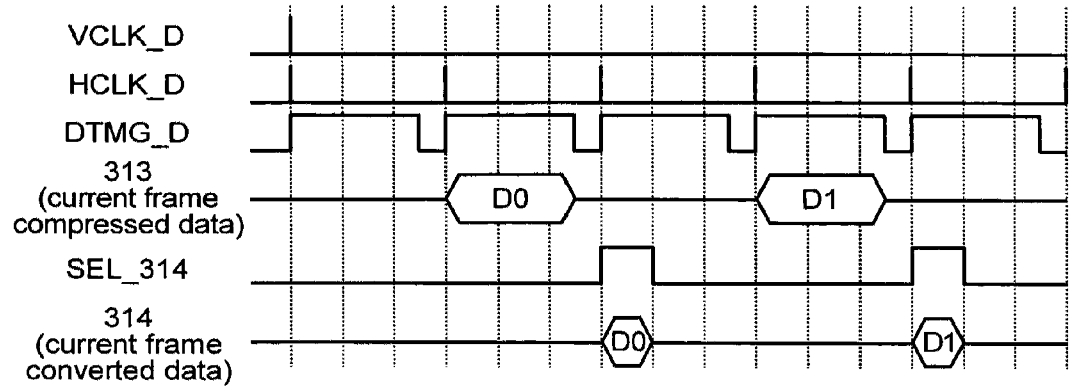
FIG. 5 is a timing chart of the input/output signals of a frequency conversion circuit 1 shown in FIG. 2.

FIG. 5 shows a timing chart of the input/output signals of the frequency conversion circuit 1 shown in FIG. 2. In FIG. 5, according to the read/write timing signal (VCLK_D, HCLK_D, DTMG_D), the frequency conversion circuit 1 obtains the current frame converted data 314 for each line from the 2-line current frame compressed data 313 asynchronously with the select signal SEL_314. The operation clock frequencies of the current frame compressed data 313 and the current frame converted data 315 are 50 MHz and 113 MHz, respectively. This current frame converted data 314 is written into the RAM 203 shown in FIG. 2.

Figure 6:
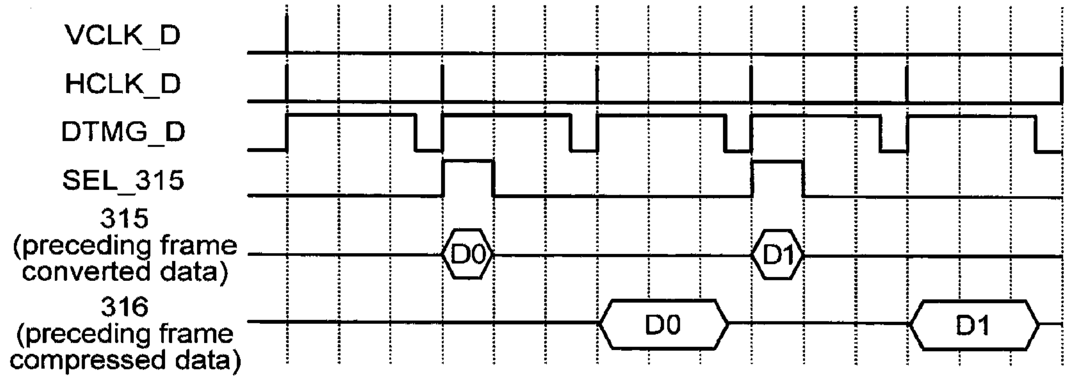
FIG. 6 is a timing chart of the input/output signals of a frequency conversion circuit 2 shown in FIG. 2.

FIG. 6 shows a timing chart of the input/output signals of the frequency conversion circuit 2 shown in FIG. 2. In FIG. 6, according to the read/write timing signal (VCLK_D, HCLK_D, DTMG_D), the frequency conversion circuit 2 obtains the preceding frame compressed data 316 from the preceding frame converted data 315 read from the RAM 203 shown in FIG. 2 synchronously with the select signal SEL_315. The operation clock frequencies of the preceding frame converted data 315 and the preceding frame compressed data 316 are 113 MHz and 50 MHz, respectively.

Figure 7:
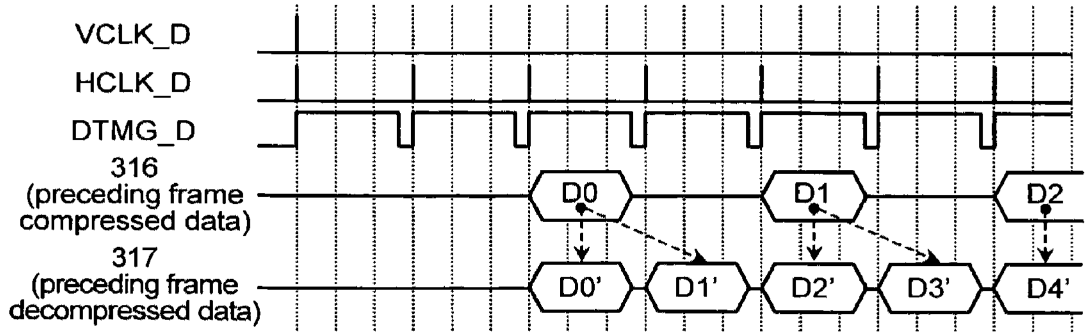
FIG. 7 is a timing chart of the input/output signals of a decompression circuit 1 shown in FIG. 2.

FIG. 7 shows a timing chart of the input/output signals of the decompression circuit 1 shown in FIG. 2. In FIG. 7, according to the read/write timing signal (VCLK_D, HCLK_D, DTMG_D), the decompression circuit 1 decompresses the preceding frame 2-line compressed data 316 at each line to obtain the preceding frame decompressed data 317 for each line.

Figure 8:
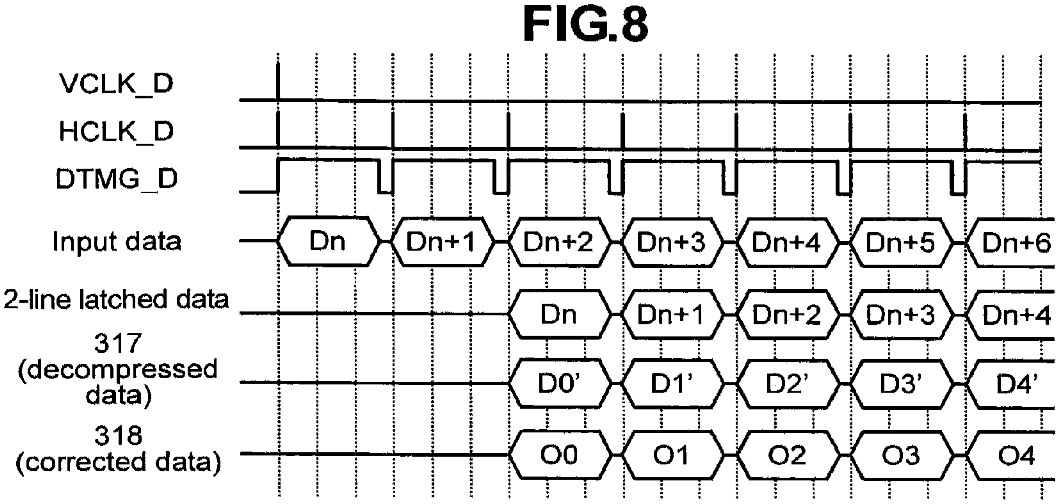
FIG. 8 is a timing chart of the input/output signals of a correction circuit 304 shown in FIG. 2.

FIG. 8 shows a timing chart of the input/output signals of the correction circuit 304 shown in FIG. 2. In FIG. 8, according to the read/write timing signal (VCLK_D, HCLK_D, DTMG_D), the correction circuit 304 calculates the 2-line latched data delayed by two lines from the input data and the decompressed data 317 received from the decompression circuit 1 to output corrected data 318.

Figure 9:
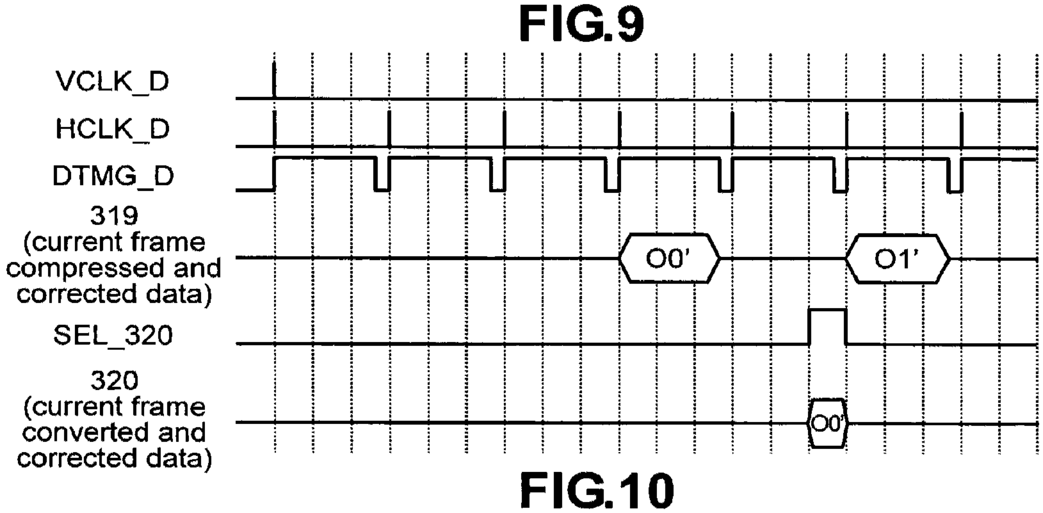
FIG. 9 is a timing chart of the input/output signals of a frequency conversion circuit 3 shown in FIG. 2.

FIG. 9 shows a timing chart of the input/output signals of the frequency conversion circuit 3 shown in FIG. 2. In FIG. 9, according to the read//write timing signal (VCLK_D, HCLK_D, DTMG_D), the frequency conversion circuit 3 obtains the current frame converted and corrected data 320 for each line from the current frame 2-line compressed and corrected data 311 received from the compression circuit 2 synchronously with the select signal SEL_320. The operation clock frequency of the current frame compressed and corrected data 319 is 50 MHz and the operation clock frequency of the current frame converted and corrected data 320 is 113 MHz. This current frame converted and corrected data 320 is written into the RAM 203 shown in FIG. 2.

Figure 10:
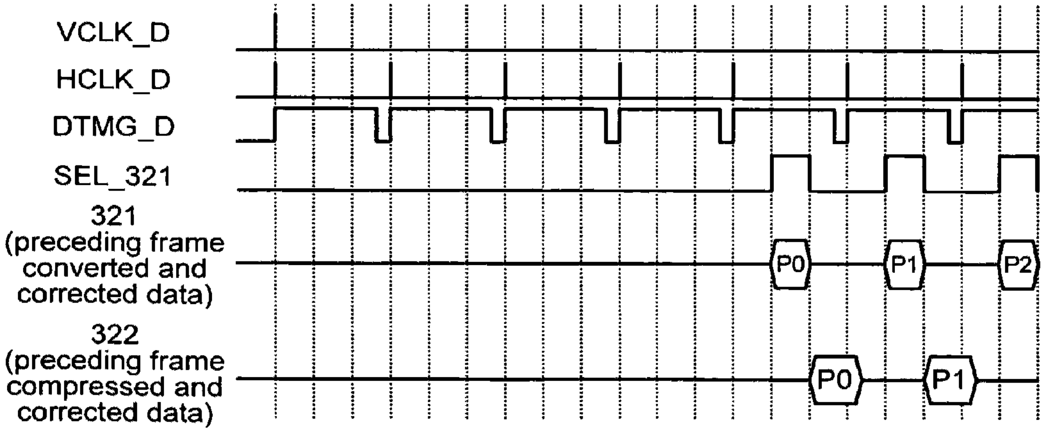
FIG. 10 is a timing chart of the input/output signals of a frequency conversion circuit 4 shown in FIG. 2.

FIG. 10 shows a timing chart of the input/output signals of the frequency conversion circuit 4 shown in FIG. 2. In FIG. 10, according to the read//write timing signal (VCLK_D, HCLK_D, DTMG_D), the frequency conversion circuit 4 obtains the preceding frame compressed and converted data 322 from the preceding frame converted and corrected data 321 read from the RAM 203 shown in FIG. 2 synchronously with the selected signal SEL_321. The operation clock frequency of the preceding frame converted and corrected data 321 is 113 MHz and the operation clock frequency of the preceding frame compressed and corrected data 322 is 100 MHz.

Figure 11:
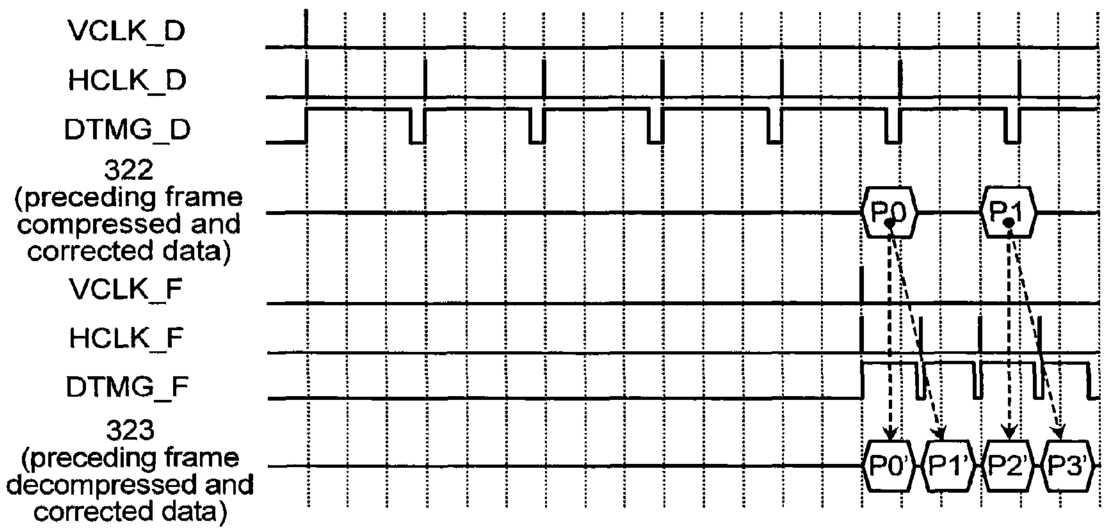
FIG. 11 is a timing chart of the input/output signals of a decompression circuit 2 shown in FIG. 2.

FIG. 11 shows a timing chart of the input/output signals of the decompression circuit 2 shown in FIG. 2. In FIG. 11, according to the read/write timing signal (VCLK_D, HCLK_D, DTMG_D), the decompression circuit 2 decompresses the preceding frame 2-line compressed and corrected data 322 received from the frequency conversion circuit 4 at each line synchronously with the double-speed driving synchronization signal (VCLK_F, HCLK_F, DTMG_F) to output the preceding frame decompressed and corrected data 323 for each line. The operation clock frequencies of the preceding frame compressed and corrected data 322 and the preceding frame decompressed and corrected data 323 are 100 MHz, respectively.

Figure 12:
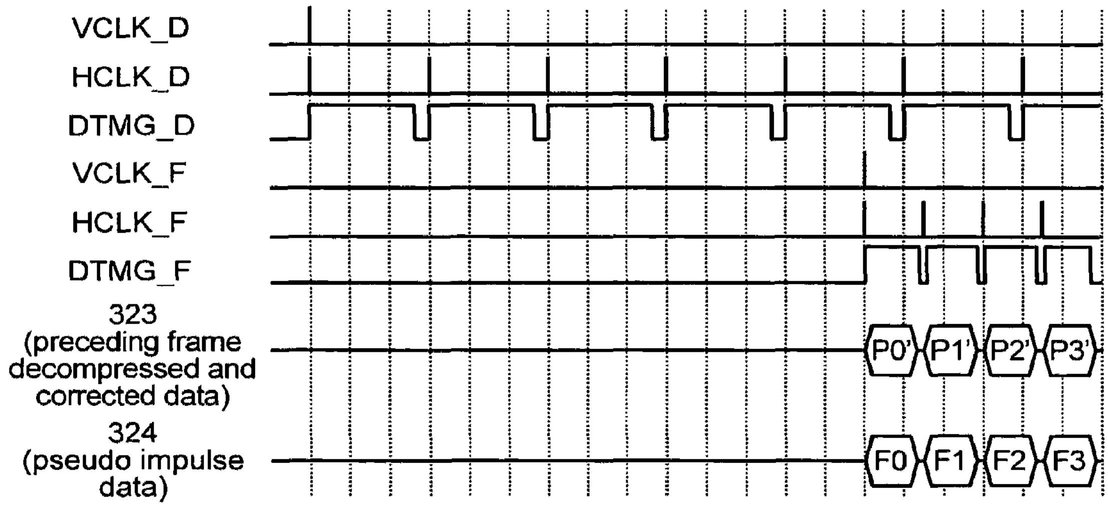
FIG. 12 is a timing chart of the input/output signals of a pseudo impulse driving circuit 305 shown in FIG. 2.

FIG. 12 shows a timing chart of the input/output signals of the pseudo impulse driving circuit 305 shown in FIG. 2. In FIG. 12, according to the read/write timing signal (VCLK_D, HCLK_D, DTMG_D), the pseudo impulse driving circuit 305 obtains the pseudo impulse data 324 from the preceding frame decompressed and corrected data 323 received from the decompression circuit 2. The operation clock frequencies of the preceding frame decompressed and corrected data 323 and the pseudo impulse data are 100 MHz, respectively.

Figure 13:
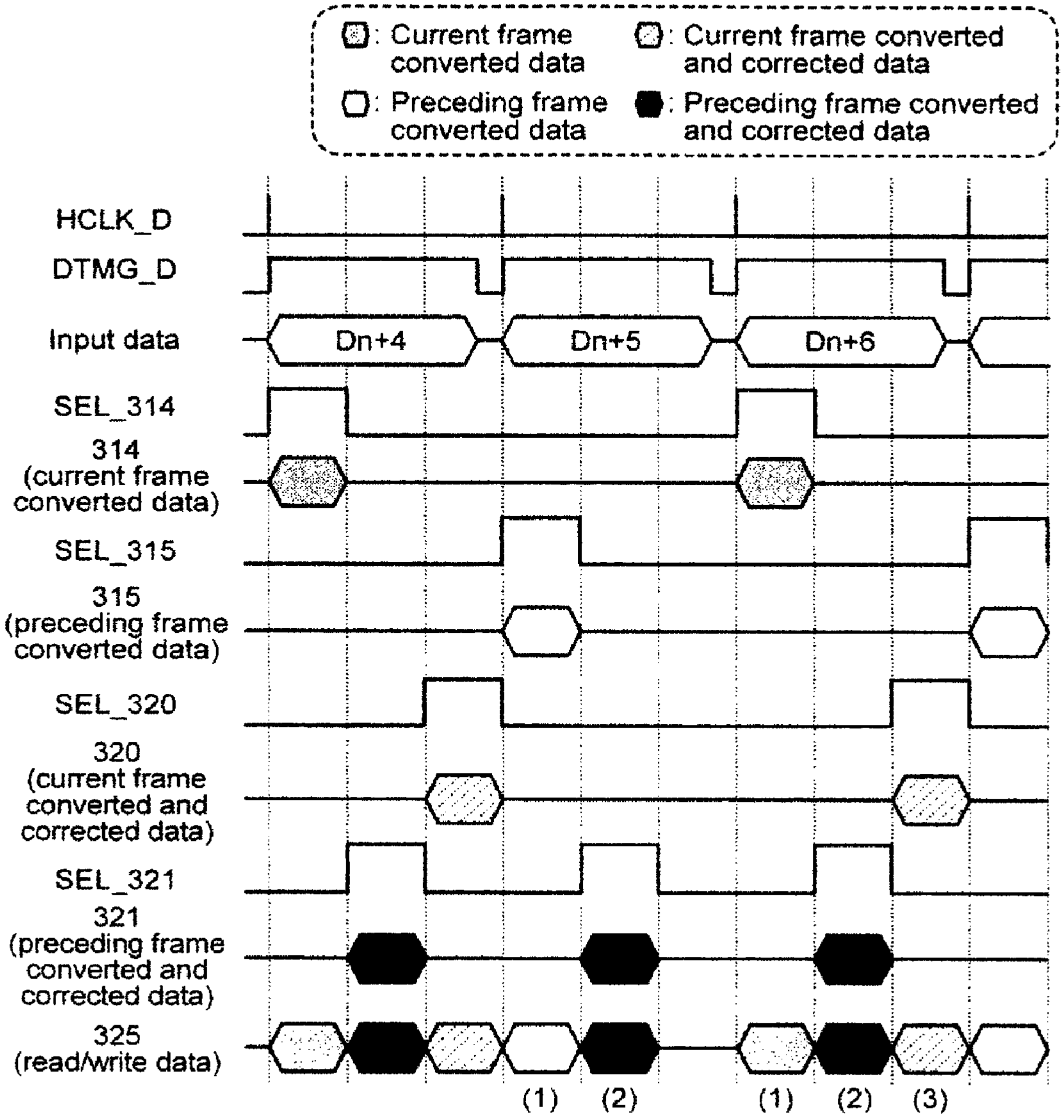
FIG. 13 is a timing chart of an input/output data bus 325 of a selector circuit 312 shown in FIG. 2.

FIG. 13 shows a timing chart of the input/output signals of the selector circuit 312 shown in FIG. 2. In FIG. 13, according to the read/write timing signal (VCLK_D, HCLK_D, DTMG_D) and input data, the selector circuit 312 writes the current frame converted data into the RAM 203 synchronously with the select signal SEL_314. Furthermore, the selector circuit 312 reads the preceding frame converted data 315 from the RAM 203 synchronously with the select signal SEL_315. Furthermore, the selector circuit 312 writes the current frame converted and corrected data 320 into the RAM 203 synchronously with the select signal SEL_320 and reads the preceding frame converted and corrected data 321 from the RAM 203 synchronously with the select signal SEL_321. In such a way, the preceding frame converted and corrected data 321 is read from the RAM 203 in each horizontal period as corrected display data.

The RAM 203 is accessed in the following order as shown in FIG. 13. On the first line; (1) preceding frame converted data (read access) and (2) preceding frame converted and corrected data (read access). On the second line; (1) current frame converted data (write access), (2) preceding frame converted and corrected data (read access), and (3) current frame converted and corrected data (write access). On the subsequent lines, the access to the RAM 203 is repeated in this order.

For example, upon inputting display data of the XGA resolution (1024 dots (+horizontal retrace time 61 dots)×768 lines), the 1H period inputted from the CPU is 1085×(1/50 MHz)=21.7 μs. The three display data to be accessed in the RAM 203 during this 1H period is 1024×0.75=768, respectively. Furthermore, if the general RAM read/write command issuing period for each of those three display data is assumed to be about 30 clocks, the result will become (768+30)×3×(1/113 MHz)≈21.2 μs. The RAM 203 read/write access time is thus fit within the 1H period inputted from the CPU.

This is why display data correction and pseudo impulse driving can be made with use of only one RAM. And although an external RAM 203 is used in this embodiment, the RAM may be provided in the image processing circuit 202; there will arise no problem even in this case. Furthermore, although the BTC method is employed to compress display data in this embodiment, another compression method may be employed. For example, it is also possible to compress data in units of two lines and employ a compression rate of 0.75 or under. Furthermore, although the XGA resolution is employed for input display data, the resolution is not limited only to that; there will arise no problem if the resolution is under XGA. And although the select signal SEL_XXX is "high" active in this embodiment, there will arise no problem even if the signal level is "low" active.

This first embodiment is applied to an image processing circuit 202 provided with a correction circuit 304 and a pseudo impulse driving circuit 305. The correction circuit 304 corrects display data of the current frame according to the display data of the preceding frame (delayed by one frame period) and the display data of the current frame. The pseudo impulse driving circuit 305 divides each frame into two subframes in a timeshared manner and the two kinds of gradation voltages are alternated between frames, thereby outputting the frames of display data to the display device. It is also possible to provide this image processing circuit 202 with compression circuits 1 and 2 shown in FIG. 2 so as to fit the total time of a plurality of read/write accesses to the RAM 203 within the 1H period inputted from the CPU as shown in FIG. 13.

Conventionally, two RAMs have been used without providing the image processing circuit with compression circuits 1 and 2; one is for correcting data and the other is for driving the pseudo impulse. Furthermore, the operation clock frequency of the data bus of the pseudo impulse driving RAM is 150 MHz, which is almost the operation frequency limit (160 MHz or so) of the general existing RAMs, so that if the clock frequency rises further, it might cause such problems as EMI (Electro Magnetic Interference), cross-talks, etc.

Second Embodiment

In this second embodiment, the YUV411 compression method is employed for the compression circuits 1 and 2 shown in FIG. 2 instead of the BTC compressing method in the first embodiment. The YUV411 method compresses data of each line. In this second embodiment, the operation clock frequency of the data bus of the RAM 203 is 125 MHz. Other operations are the same as those in the first embodiment.

Figure 14:
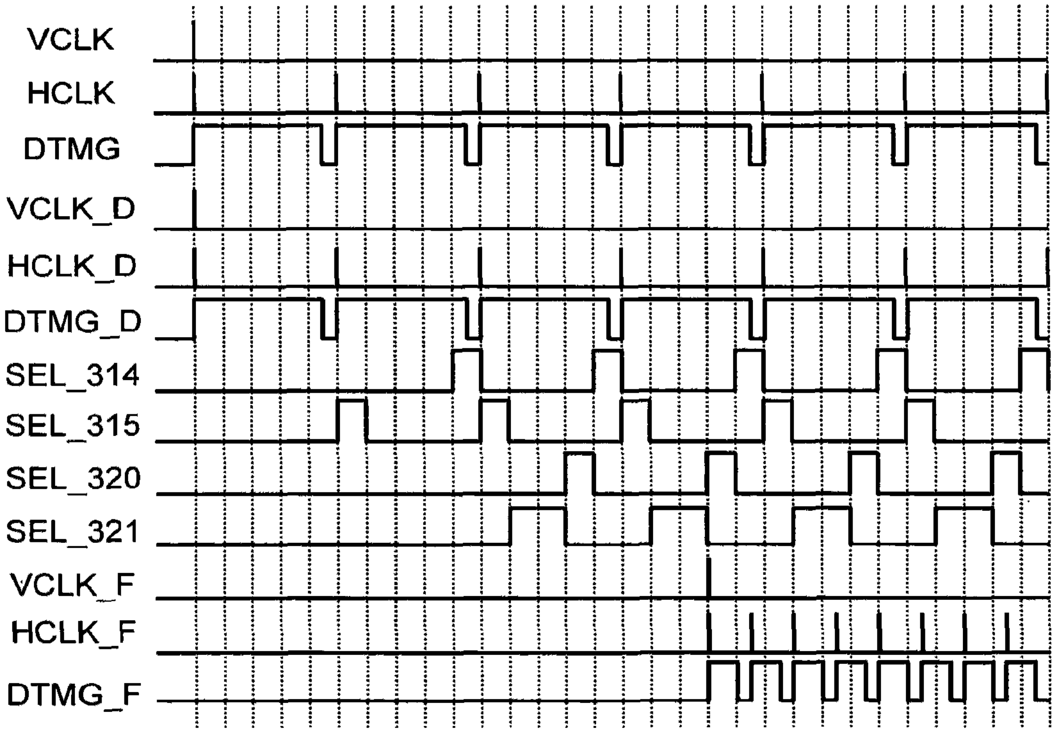
FIG. 14 is a timing chart of the signals generated by a control signal generation circuit 301 shown in FIG. 2, which divides one H period into five sub-periods to generate those signals.

FIG. 14 is a timing chart of the signals generated in the control signal generation circuit 301 shown in FIG. 2. The circuit 301 divides the 1H period into 5 sub-periods to generate those signals. In FIG. 14, according to the input synchronization signals (VCLK, HCLK, and DTMG), the control signal generation circuit 301 generates the read/write timing signals (VCLK_D, HCLK_D, and DTMG_D) of each of the line memories of the compression circuits land 2, the select signals (SEL_314, SEL_315, SEL_320, and SEL_321) of the selector circuit 312 shown in FIG. 2, respectively, as well as the double speed driving synchronization signals (VCLK_F, HCLK_F, and DTMG_F), respectively.

Figure 15:
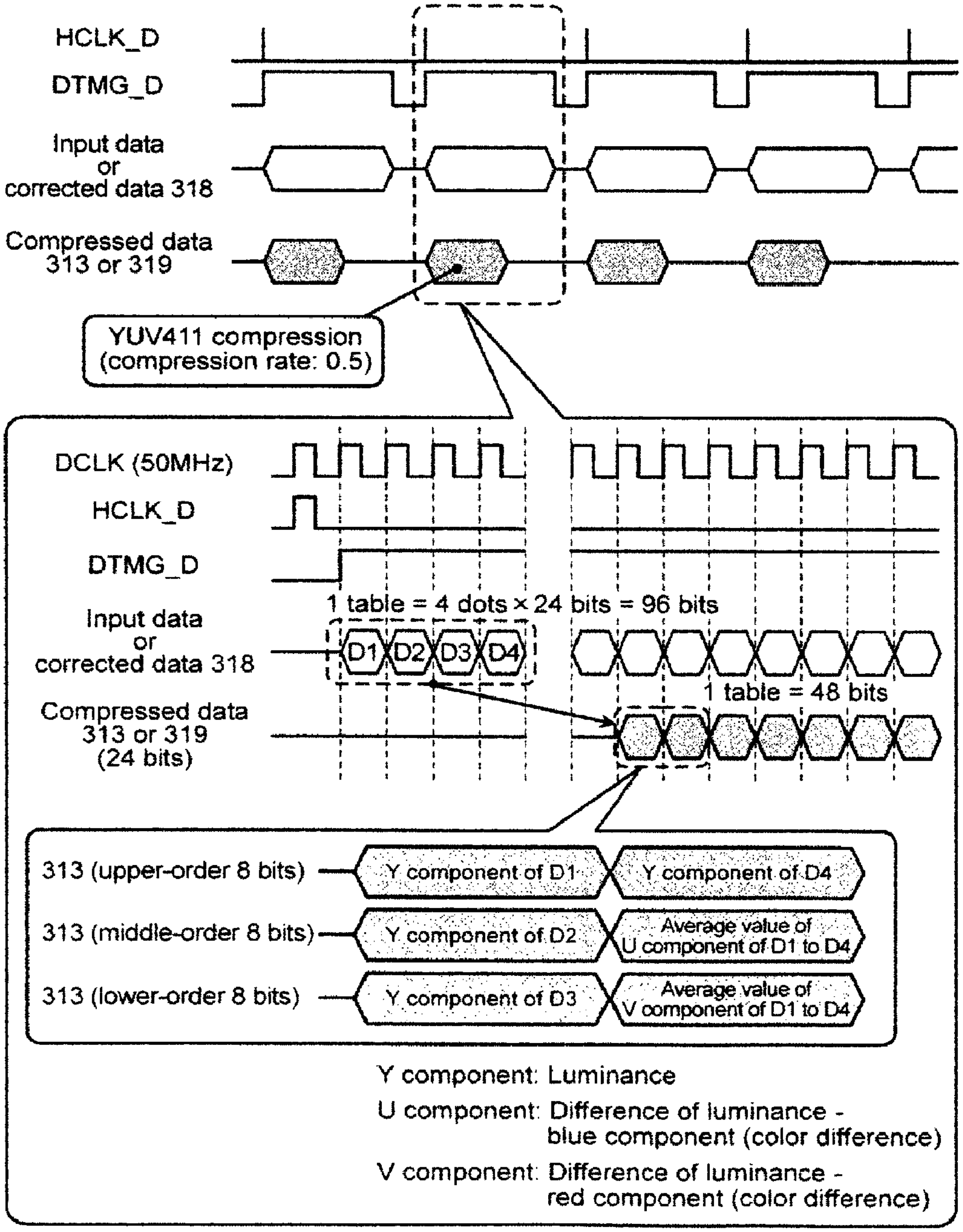
FIG. 15 is a diagram for describing the compression method (YUV411) employed for the compression circuits 1 and 2 shown in FIG. 2.

FIG. 15 shows a diagram that describes the compression method (YUV411) employed for the compression circuits 1 and 2 shown in FIG. 2. In FIG. 15, the compression circuit 1 compresses input data synchronously with the read/write timing signal (HCLK_D, DTMG_D) generated in the control signal generation circuit 301 shown in FIG. 2 to output compressed data 313. Similarly, the compression circuit 2 compresses the corrected data 318 to output compressed data 319.

Here, the frequency of the operation clock DCLK is assumed as 50 MHz to compress input data or corrected data 318 synchronously with the read/write timing signal (HCLK_D, DTMG_D). In this case, one table is assumed as 4 dots×24 bits=96 bits. The 96-bit data is compressed up to 48-bit data, so that the data compression rate is 48 bits/96 bits=0.5. Consequently, the operation clock frequency of the data bus of the RAM 203 is calculated as 0.5 (date compression rate)×5 (the number of R/W operations during the 1H period)×50 MHz (input operation clock frequency)=125 MHz.

Figure 16:
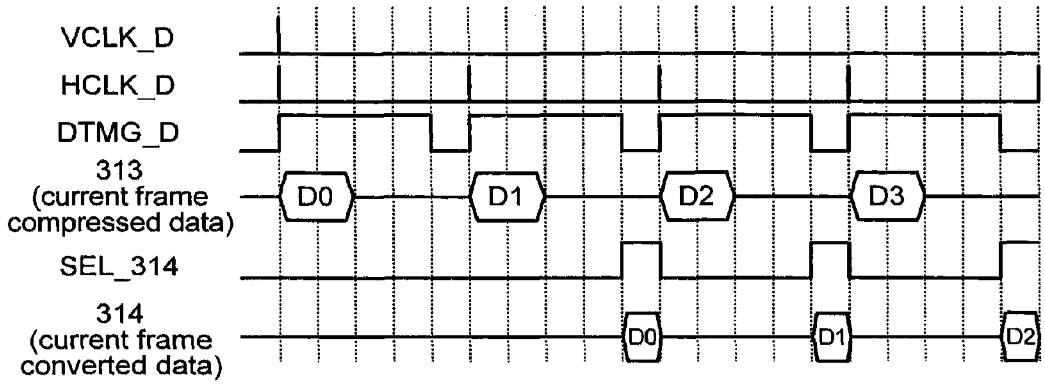
FIG. 16 is another timing chart of the input/output signals of the frequency conversion circuit 1 shown in FIG. 2.

FIG. 16 shows a timing chart of the input/output signals of the frequency conversion circuit 1 shown in FIG. 2. In FIG. 16, according to the read/write timing signal (VCLK_D, HCLK_D, DTMG_D), the frequency conversion circuit 1 obtains the compressed data 313 of the current frame from the converted data 314 of the current frame synchronously with the select signal SEL_314. The operation clock frequency of the compressed data 313 of the current frame is 50 MHz and that of the converted data 314 of the current frame is 125 MHz. This current frame converted data 314 is written into the RAM 302 shown in FIG. 2.

Figure 17:
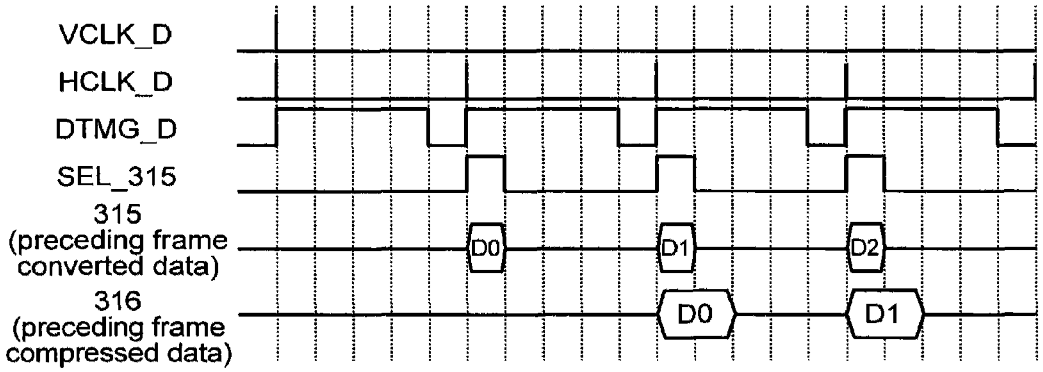
FIG. 17 is another timing chart of the input/output signals of the frequency conversion circuit 2 shown in FIG. 2.

FIG. 17 shows a timing chart of the input/output signals of the frequency conversion circuit 2 shown in FIG. 2. In FIG. 17, according to the read/write timing signal (VCLK_D, HCLK_D, DTMG_D), the frequency conversion circuit 2 obtains the compressed data 316 of the preceding frame from the converted data 315 of the preceding frame read from the RAM shown in FIG. 2 synchronously with the select signal SEL_315. The operation clock frequency of the compressed data 315 of the preceding frame is 125 MHz and that of the compressed data 316 of the preceding frame is 50 MHz.

Figure 18:
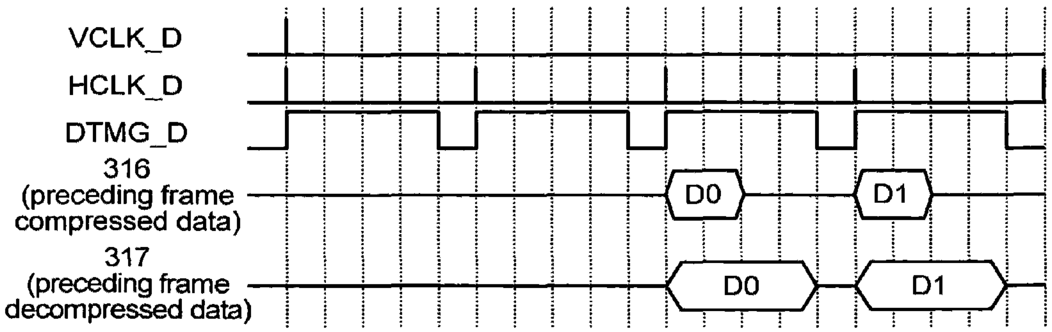
FIG. 18 is another timing chart of the input/output signals of the decompression circuit 1 shown in FIG. 2.

FIG. 18 shows a timing chart of the input/output signals of the decompression circuit 1 shown in FIG. 2. In FIG. 18, according to the read/write timing signal (VCLK_D, HCLK_D, DTMG_D), the decompression circuit 1 decompresses the compressed data 316 of the preceding frame received from the frequency conversion circuit 2 to obtain the decompressed data 317 of the preceding frame.

Figure 19:
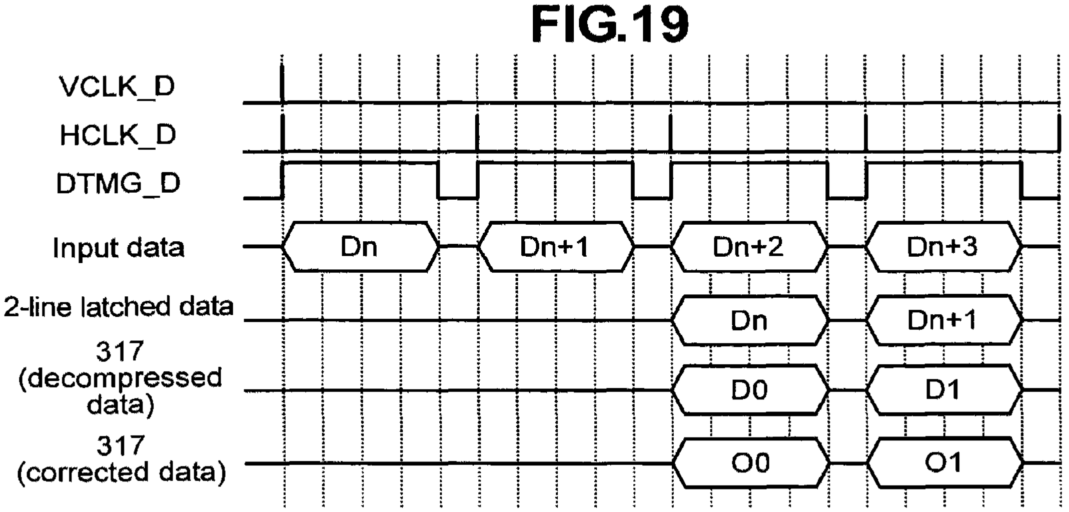
FIG. 19 is another timing chart of the input/output signals of the correction circuit 304 shown in FIG. 2.

FIG. 19 shows a timing chart of the input/output signals of the correction circuit 304 shown in FIG. 2. In FIG. 19, according to the read/write timing signal (VCLK_D, HCLK_D, DTMG_D), the correction circuit 304 calculates 2-line latched data delayed by two lines from the input data and the decompressed data 317 received from the decompression circuit 1 to output corrected data 318.

Figure 20:
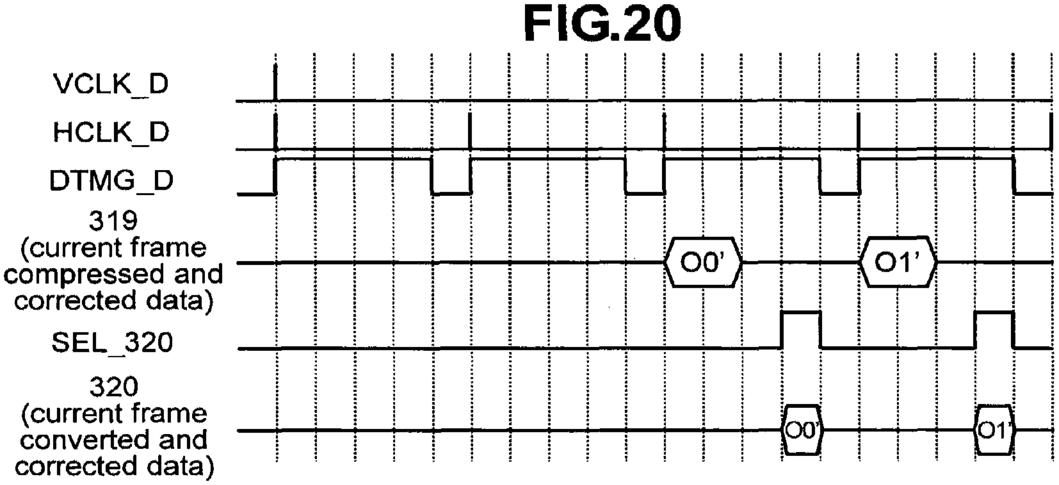
FIG. 20 is another timing chart of the input/output signals of the frequency conversion circuit 3 shown in FIG. 2.

FIG. 20 shows a timing chart of the input/output signals of the frequency conversion circuit 3 shown in FIG. 2. In FIG. 20, according to the read/write timing signal (VCLK_D, HCLK_D, DTMG_D), the frequency conversion circuit 3 obtains the current frame converted and corrected data 320 from the current frame compressed and corrected data 319 received from the compression circuit 2 synchronously with the select signal SEL_320. The operation clock frequency of the compressed and corrected data 319 of the current frame is 50 MHz and that of the converted and corrected data 320 of the current frame is 125 MHz. This current frame converted and corrected data 320 is written into the RAM 302 shown in FIG. 2.

Figure 21:
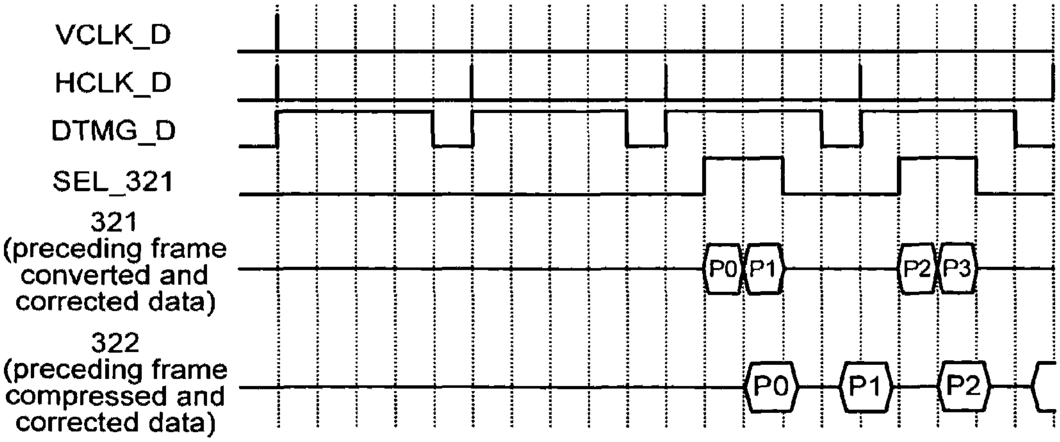
FIG. 21 is another timing chart of the input/output signals of the frequency conversion circuit 4 shown in FIG. 2.

FIG. 21 shows a timing chart of the input/output signals of the frequency conversion circuit 4 shown in FIG. 2. In FIG. 21, according to the read/write timing signal (VCLK_D, HCLK_D, DTMG_D), the frequency conversion circuit 4 obtains 1-line compressed and corrected data 322 of the preceding frame used for double-speed driving from the 2-line converted and corrected 321 of the preceding frame read from the RAM 203 shown in FIG. 2 synchronously with the select signal SEL_321. The operation clock frequency of the converted and corrected data 321 of the preceding frame is 125 MHz and that of the compressed and corrected data 322 of the preceding frame is 100 MHz.

Figure 22:
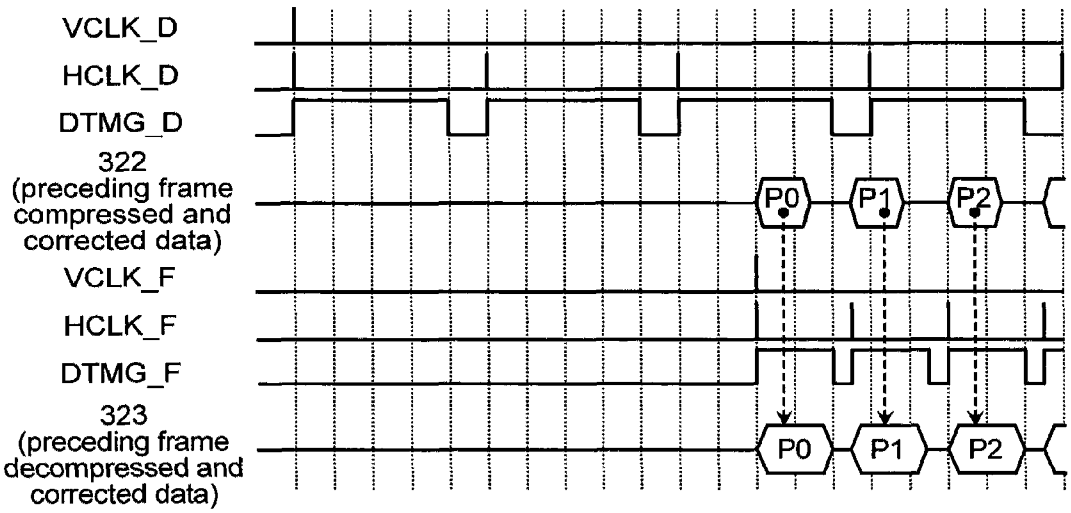
FIG. 22 is another timing chart of the input/output signals of a decompression circuit 2 shown in FIG. 2.

FIG. 22 shows a timing chart of the input/output signals of the decompression circuit 2 shown in FIG. 2. In FIG. 22, according to the read/write timing signal (VCLK_D, HCLK_D, DTMG_D), the decompression circuit 2 decompresses the compressed and corrected data 322 of the preceding frame received from the frequency conversion circuit 4 synchronously with the double-speed driving synchronization signal (VCLK_F, HCLK_F, DTMG_F) and outputs decompressed and corrected data 323 of the preceding frame. The operation clock frequency of the compressed and corrected data 322 of the preceding frame is 100 MHz and that of the decompressed and corrected data 323 of the preceding frame is also 100 MHz.

The timing chart of the input/output signals of the pseudo impulse driving circuit 305 shown in FIG. 2 is the same as that shown in FIG. 12.

Figure 23:
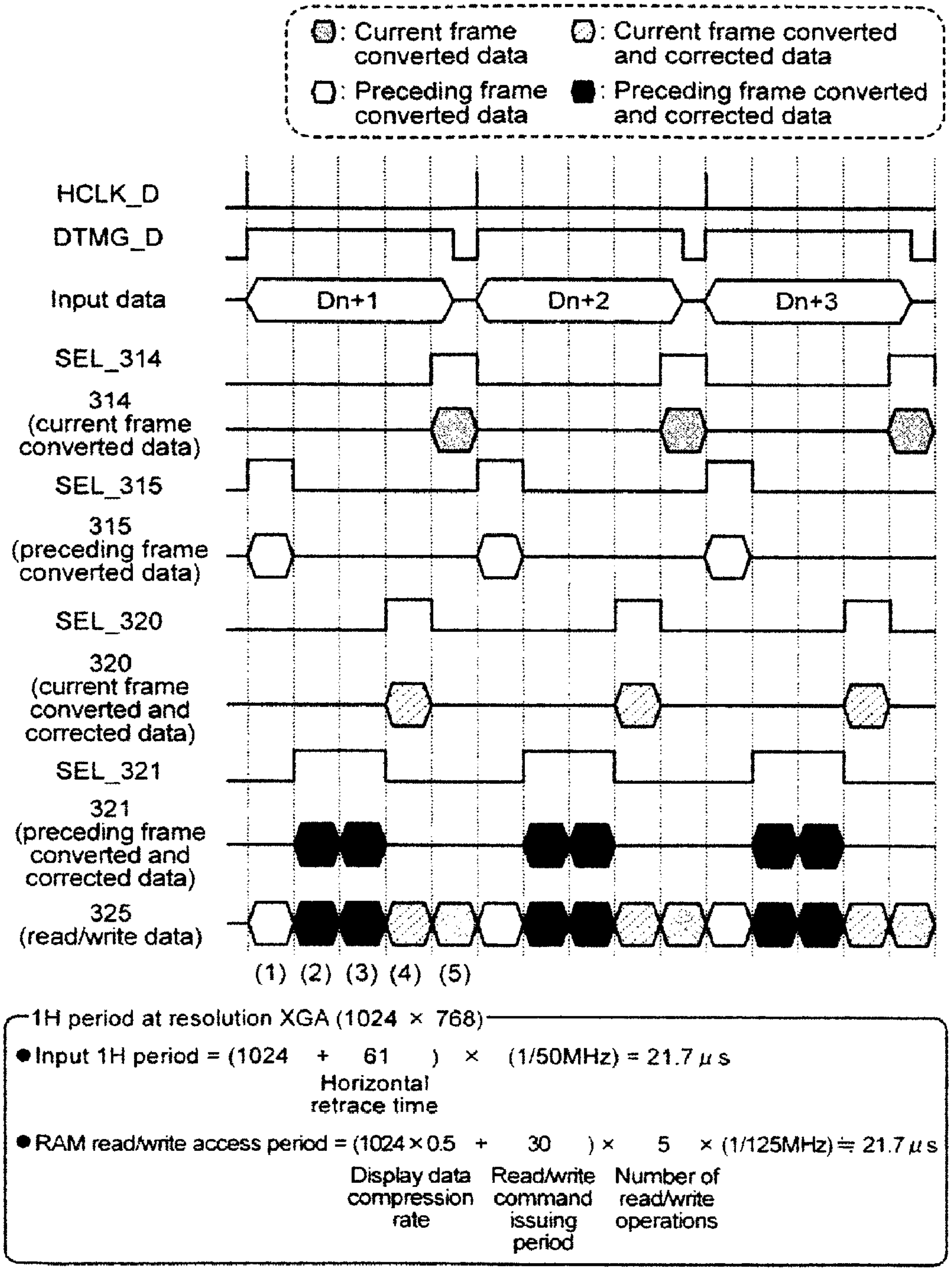
FIG. 23 is another timing chart of the input/output data bus 325 of the selector circuit 312 shown in FIG. 2.

FIG. 23 shows a timing chart of the input/output signals of the selector circuit 312 shown in FIG. 2. In FIG. 23, according to the read/write timing signal (HCLK_D, DTMG_D) and input data, the selector circuit 312 writes the converted data 314 of the current frame into the RAM 203 synchronously with the select signal SEL_314. Furthermore, the selector circuit 312 reads the converted data 315 of the preceding frame from the RAM 203 synchronously with the select signal SEL_315 and writes the converted and corrected data 320 of the current frame into the RAM 203 synchronously with the select signal SEL_320. The selector circuit 312 also reads the 2-line converted and corrected data 321 of the preceding frame from the RAM 203 synchronously with the select signal SEL_321. In such a way, the 2-line converted and corrected data 321 of the preceding frame is read twice from the RAM 203 in each horizontal period as corrected display data.

Accessing the display data in the RAM 203 is made in the following order as shown in FIG. 23; (1) preceding frame converted data (read access), (2) preceding frame converted and corrected data (read access), (3) preceding frame converted and corrected data (read access), (4) current frame converted and corrected data (write access), and (5) current frame converted data (write access). Hereinafter, the access to the RAM 203 is repeated in this order.

For example, upon inputting display data of the XGA resolution (1024 dots (+horizontal return time 61 dots)×768 lines), the 1H period inputted from the CPU is 1085×(1/50 MHz)=21.7 μs. And display data and corrected data to be accessed in the RAM 203 during this 1H period is 1024×0.5=512, respectively. Furthermore, if the read/write command issuing period with respect to a general RAM is assumed as about 30 clocks, the result will become (512+30)×5×(1/125 MHz)≈21.7 μs. The read/write time to access the RAM 203 will thus be fit within the 1H period inputted from the CPU.

As described above, both display data correction and pseudo impulse driving can be made with use of only one RAM even when the YUV411 compression method is employed to compress data of each line. Although the YUV411 compression method is employed in this embodiment, the compressing method is not limited only to that one. For example, display data may be compressed line by line and the compression rate of the display data may be 0.5 or under.

Third Embodiment

In this third embodiment, the BTC compression method in the first embodiment is employed for the compression circuit 1 shown in FIG. 2 and the YUV411 compression method in the second embodiment is employed for the compression circuit 2 shown in FIG. 2. In this third embodiment, the operation clock frequency of the data bus of the RAM 203 is 113 MHz. This means that if the data compression rate is 0.75 and the number of R/W operations during the 1H period of the subject data is once when the BTC compression method is employed for the compression circuit 1 and the data compression rate is 0.5 and the number of R/W operations during the 1H period of the subject data is three times when the YUV411 compression method is employed for the compression circuit 2 while the input operation clock frequency is 50 MHz, respectively, the result will become (0.75×1+0.5×3)×50

MHz≈113 MHz. Other operations in this third embodiment are the same as those in the first embodiment.

Figure 24:
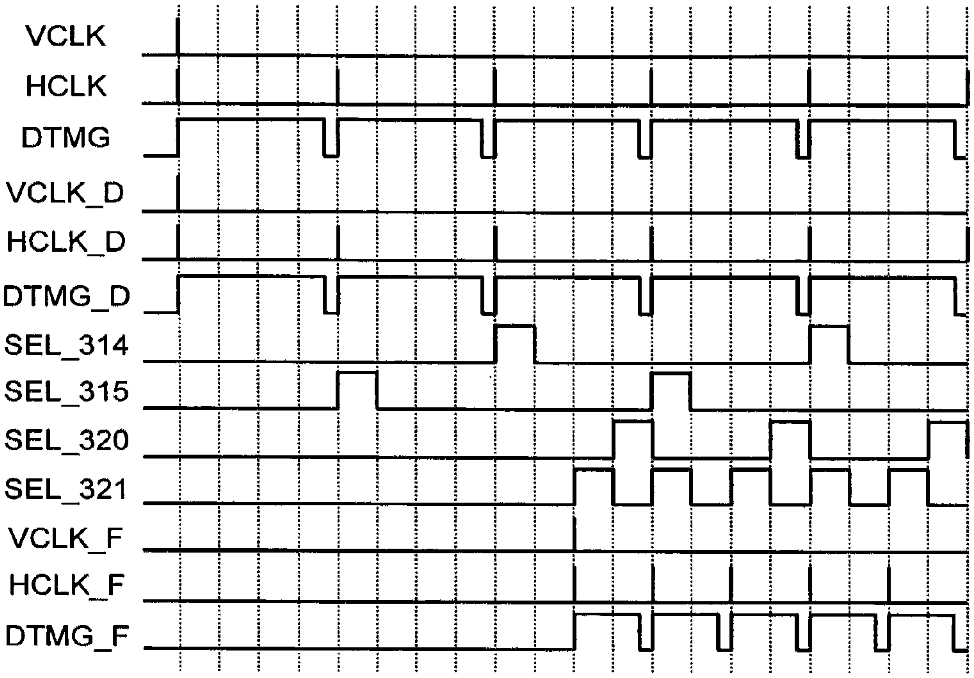
FIG. 24 is a timing chart of the signals generated by the control signal generation circuit 301 shown in FIG. 2, which divides one H period into four sub-periods to generate those signals.

FIG. 24 shows a timing chart of the signals generated in the control signal generation circuit 301 shown in FIG. 2. The circuit 301 divides the 1H period into four sub-periods to generate those signals. In FIG. 24, according to the input synchronization signals (VCLK, HCLK, and DTMG), the control signal generation circuit 301 generates the read/write timing signals (VCLK_D, HCLK_D, and DTMG_D) of each of the line memories of the compression circuits land 2, the select signals (SEL_314, SEL_315, SEL_320, and SEL_321) of the selector circuit 312 shown in FIG. 2, respectively, as well as the double-speed driving synchronization signals (VCLK_F, HCLK_F, and DTMG_F), respectively.

Figure 25:
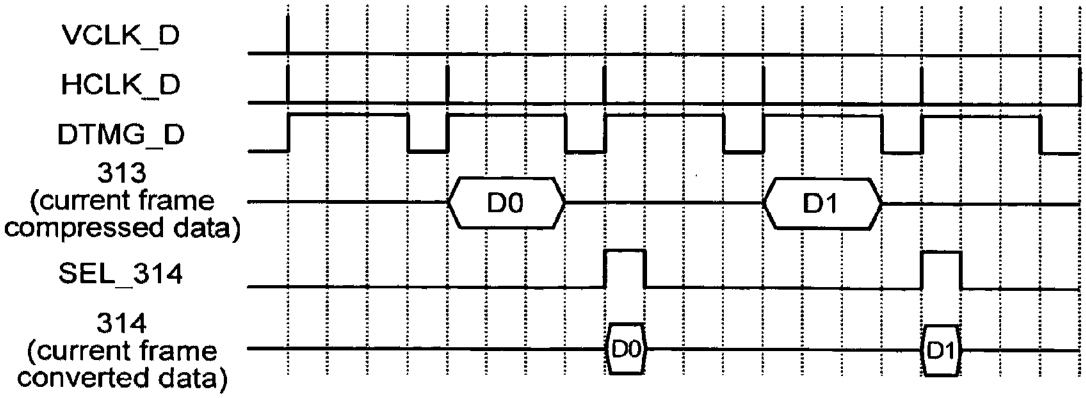
FIG. 25 is still another timing chart of the input/output signals of the frequency conversion circuit 1 shown in FIG. 2.

FIG. 25 shows a timing chart of the input/output signals of the frequency conversion circuit 1 shown in FIG. 2. In FIG. 25, according to the read/write timing signal (VCLK_D, HCLK_D, DTMG_D), the frequency conversion circuit 1 obtains the converted data 314 of the current frame from the 2-line compressed data 313 of the current frame at each line synchronously with the select signal SEL_314. The operation clock frequency of the compressed data 314 of the current frame is 50 MHz and that of the converted data 314 of the current frame is 113 MHz. This current frame converted data 314 is written into the RAM 203 shown in FIG. 2.

Figure 26:
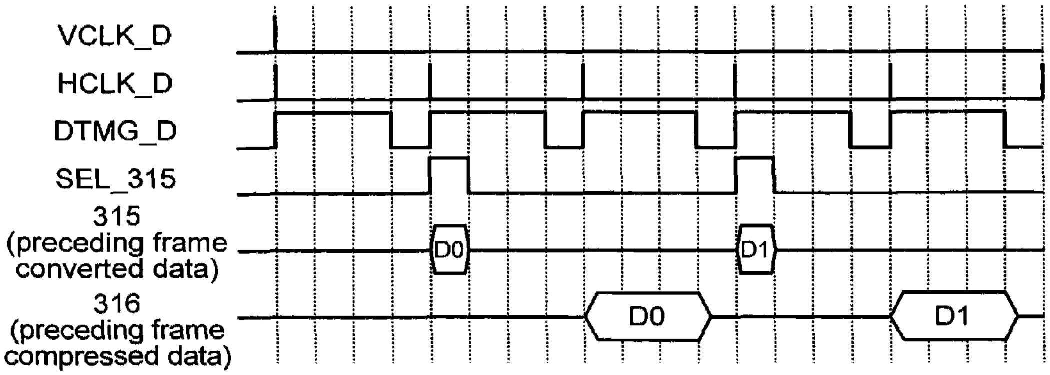
FIG. 26 is still another timing chart of the input/output signals of the frequency conversion circuit 2 shown in FIG. 2.

FIG. 26 shows a timing chart of the input/output signals of the frequency conversion circuit 2 shown in FIG. 2. In FIG. 26, according to the read/write timing signal (VCLK_D, HCLK_D, DTMG_D), the frequency conversion circuit 2 obtains the compressed data 316 of the preceding frame from the converted data 315 of the preceding frame read from the RAM 203 shown in FIG. 2 synchronously with the select signal SEL_315 and. The operation clock frequency of the converted data 315 of the preceding frame is 113 MHz and that of the compressed data 316 of the preceding frame is 50 MHz.

Figure 27:
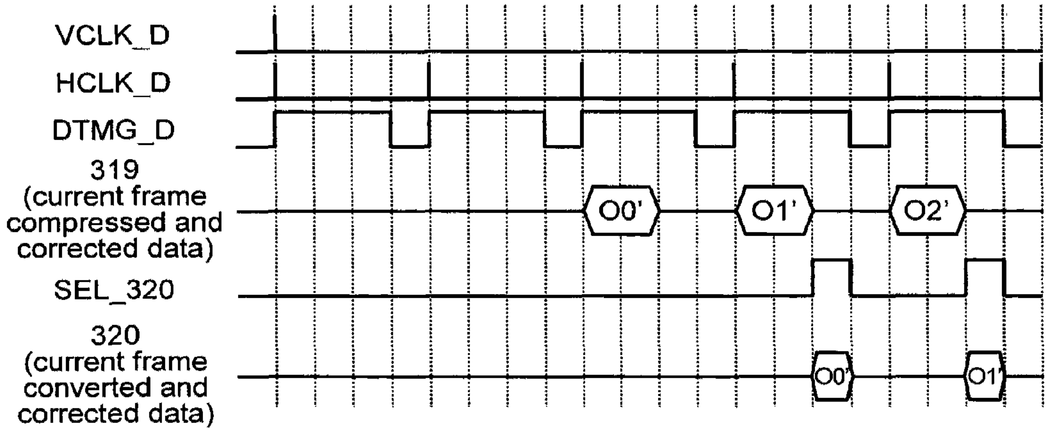
FIG. 27 is still another timing chart of the input/output signals of the frequency conversion circuit 3 shown in FIG. 2.

FIG. 27 shows a timing chart of the input/output signals of the frequency conversion circuit 3 shown in FIG. 2. In FIG. 27, according to the read/write timing signal (VCLK_D, HCLK_D, DTMG_D), the frequency conversion circuit 3 obtains the converted and corrected data 320 of the current frame from the compressed and corrected data 319 of the current frame received from the compression circuit 2 synchronously with the select signal SEL_320. The operation clock frequency of the compressed and corrected data 319 of the current frame is 50 MHz and that of the converted and compressed data 320 of the current frame is 113 MHz. This current frame converted and corrected data 320 is written into the RAM 203 shown in FIG. 2.

Figure 28:
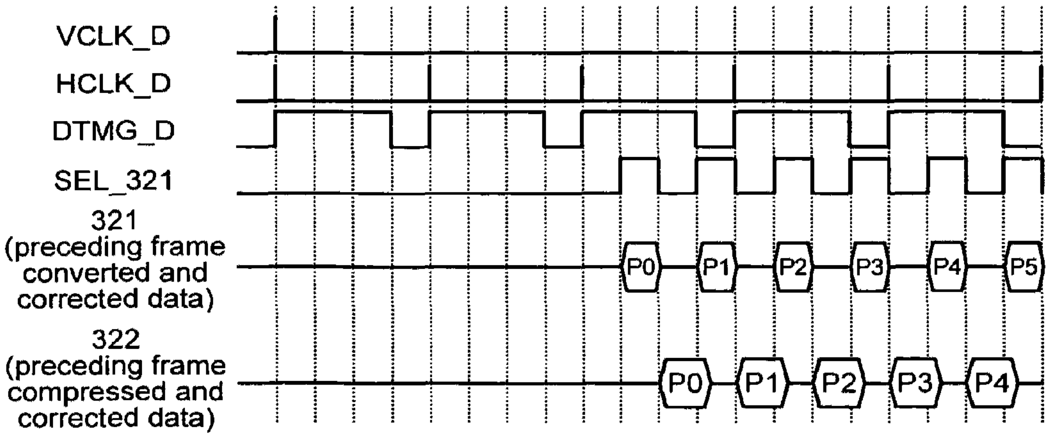
FIG. 28 is still another timing chart of the input/output signals of the frequency conversion circuit 4 shown in FIG. 2.

FIG. 28 shows a timing chart of the input/output signals of the frequency conversion circuit 4 shown in FIG. 2. In FIG. 28, according to the read/write timing signal (VCLK_D, HCLK_D, DTMG_D), the frequency conversion circuit 4 obtains the 1-line compressed and corrected data 322 of the preceding frame used for double-speed driving, from the 2-line converted and corrected data 321 of the preceding frame, read from the RAM 203 shown in FIG. 2 synchronously with the select signal SEL_321. The operation clock frequency of the converted and corrected data 321 of the preceding frame is 113 MHz and that of the compressed and corrected data 322 of the preceding frame is 100 MHz.

Figure 29:
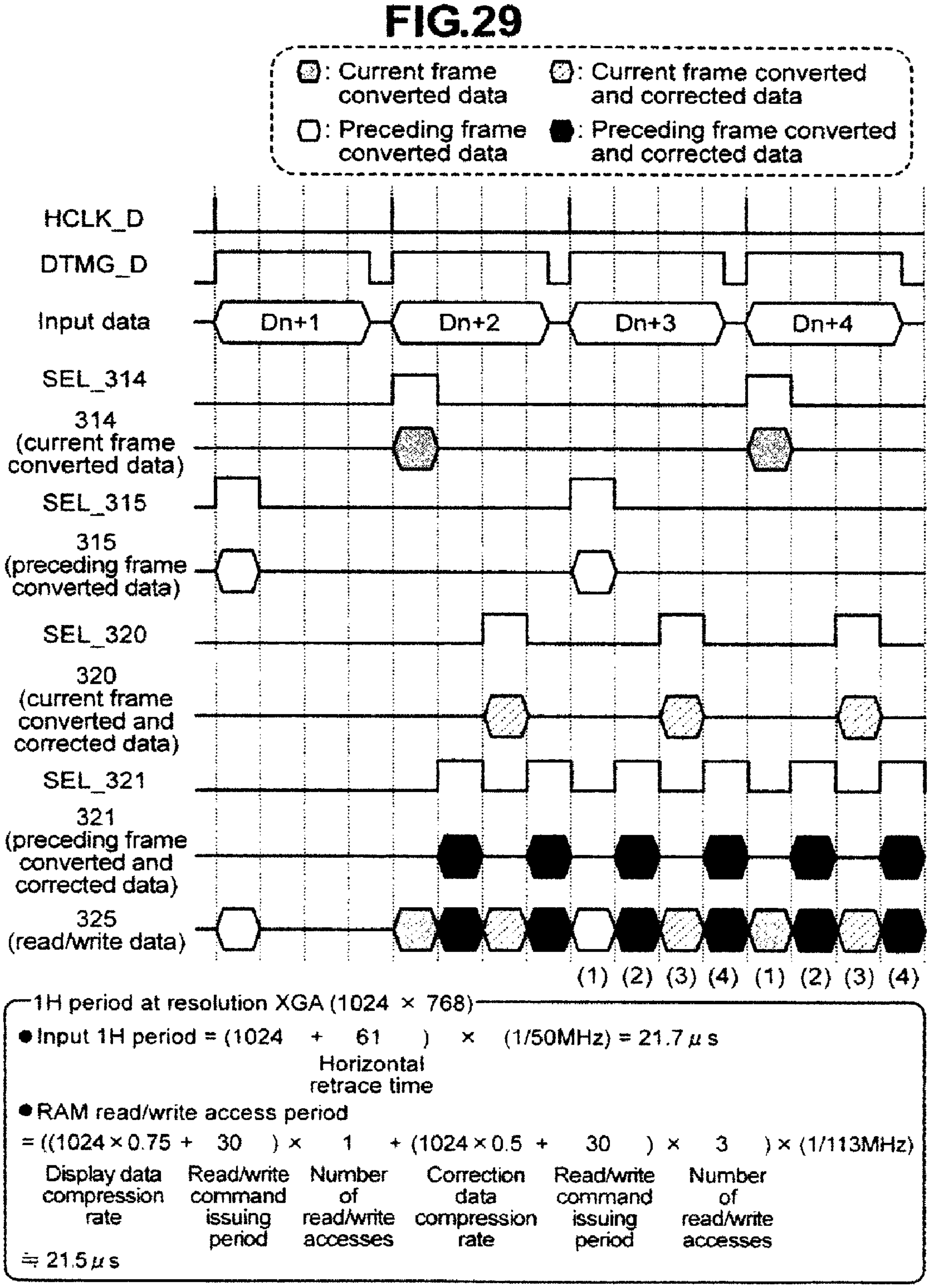
FIG. 29 is still another timing chart of the input/output data bus 325 of the selector circuit 312 shown in FIG. 2.

FIG. 29 shows a timing chart of the input/output signals of the selector circuit 312 shown in FIG. 2. In FIG. 29, according to the read/write timing signal (HCLK_D, DTMG_D) and input data, the selector circuit 312 writes the converted data 314 of the current frame into the RAM 203 synchronously with the select signal SEL_314. Furthermore, the selector circuit 312 reads the converted data 315 of the preceding frame from the RAM 203 synchronously with the select signal SEL_315. The selector circuit 312 also writes the converted and corrected data 320 of the current frame into the RAM 203 synchronously with the select signal SEL_320 and reads the 2-line converted and corrected data 321 of the preceding frame from the RAM 203 synchronously with the select signal SEL_321. In such a way, the 2-line converted and corrected data 321 of the preceding frame is read twice from the RAM 203 in each horizontal period as corrected display data.

Accessing display data in the RAM 203 is made in the following order as shown in FIG. 29. On the first line; (1) preceding frame converted data (read access), (2) preceding frame converted and corrected data (read access), (3) preceding frame converted and corrected data (read access), (4) current frame converted and corrected data (write access). And on the second line; (1) current frame converted data (write access), (2) preceding frame converted and corrected data (read access), (3) preceding frame converted and corrected data (read access), and (4) current frame converted and corrected data (write access). Hereinafter, the access to the RAM 203 is repeated in this order.

For example, upon inputting display data of the XGA resolution (1024 dots (+horizontal retrace time 61 dots)×768 lines), the 1H period inputted from the CPU is 1085×(1/50 MHz)=21.7 μs. On the other hand, each of the display data and the corrected data to be accessed in the RAM 203 during this 1H period is calculated as 1024×0.75=768 and 1024×0.5=512. Furthermore, if the read/write command issuing period with respect to a general RAM is about 30 clocks, the result will become (768×1+512×3+30×4)×(1/113 MHz)≈21.5 μs, so that the read/write access time with respect to the RAM 203 will thus be fit within the 1H period inputted from the CPU.

As described above, therefore, both the display data correction and the pseudo impulse driving can be carried out with use of only one RAM even when the BTC compression method is employed for the compression circuit 1 and the YUV411 compression method is employed for the compression circuit 2. And while both the BTC compression method and the YUV411 compression method are employed in this embodiment, the compression method may not be limited only to those methods. For example, there will arise no problem even when the compression is made in units of two lines or for every line and the display data compression rate is 0.75 or 0.5 or under.

Fourth Embodiment

Figure 30:
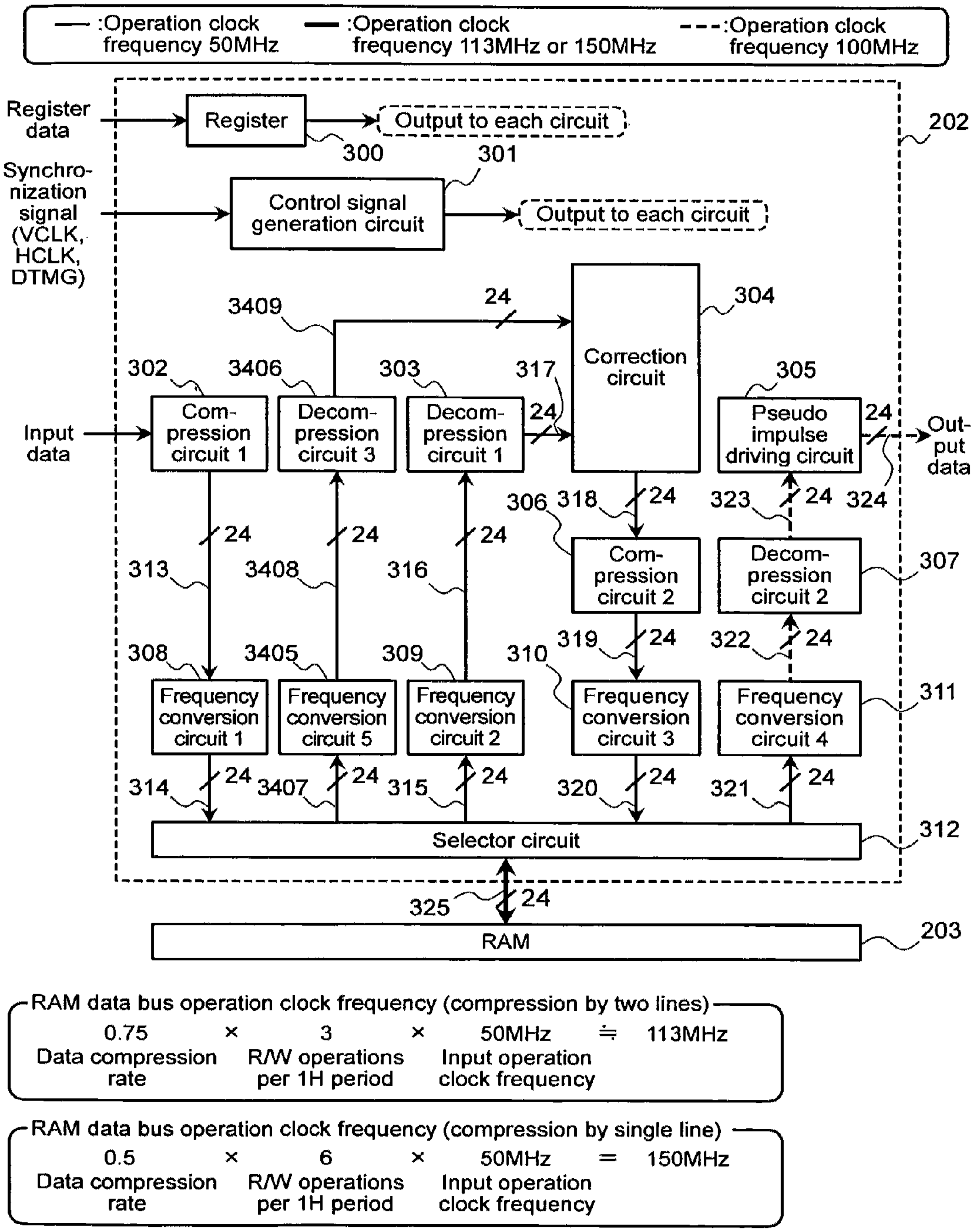
FIG. 30 is another configuration of the image processing circuit 202 shown in FIG. 1.

FIG. 30 shows a configuration of the image processing circuit 202 shown in FIG. 1. In this fourth embodiment, the correction circuit 304 adds the decompressed data 3409 of the frame before the preceding one received from the newly provided frequency conversion circuit 5 (3405) and the decompression circuit 3 (3406) to the decompressed data 317 of the preceding frame received from the decompression circuit 1 to generate corrected data 318. Other components in the configuration are the same as those shown in FIG. 2.

In FIG. 30, the operation clock frequency of the data bus of the RAM 203 is 113 MHz when the BTC compressing method is employed for the compression circuits 1 and 2, respectively. When the YUV411 compression method is employed for the compression circuits 1 and 2, respectively, the operation clock frequency of the data bus of the RAM 203 is 150 MHz.

FIGS. 31 through 35 show the timing charts of the signals of the compression circuits 1 and 2 when the BTC compression method is employed for those circuits 1 and 2.

Figure 31:
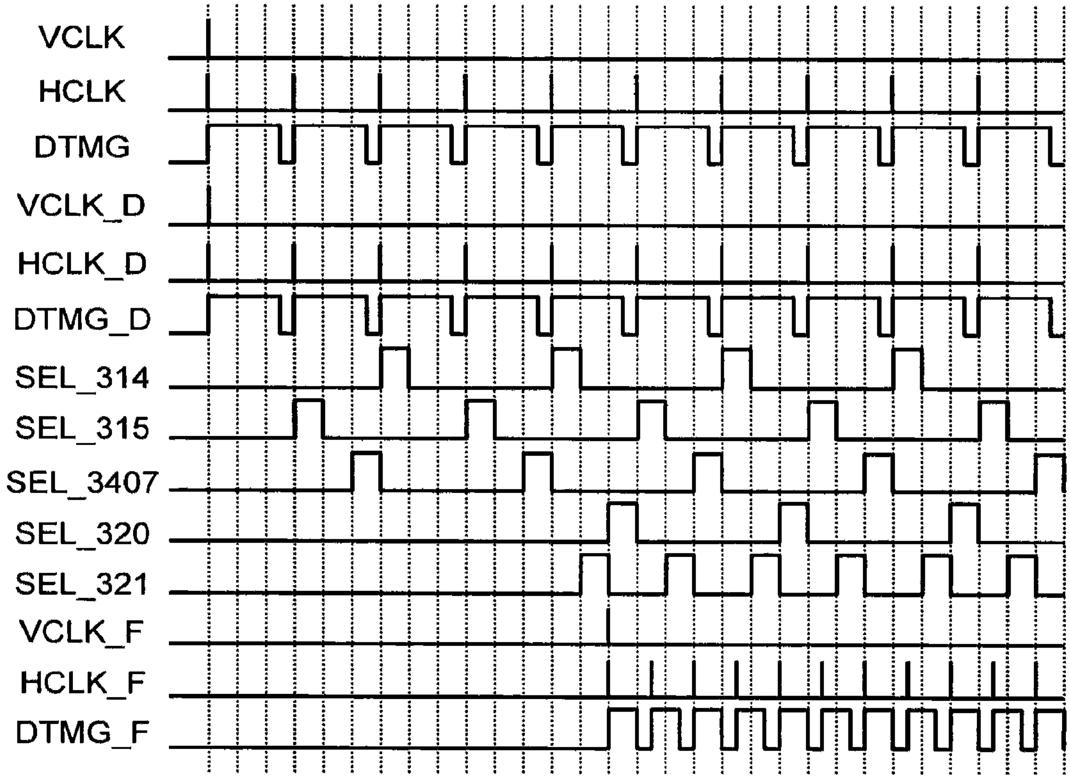
FIG. 31 is a timing chart of signals generated by the control signal generation circuit 301 shown in FIG. 30, which divides one H period into three sub-periods to generate those signals.

FIG. 31 shows a timing chart of the signals generated in the control signal generation circuit 301 shown in FIG. 30. The circuit 301 divides one 1H period into three sub-periods to generate those signals. In FIG. 31, according to the input synchronization signals (VCLK, HCLK, and DTMG), the control signal generation circuit 301 generates the read/write timing signals (VCLK_D, HCLK_D, and DTMG_D) of each of the line memories of the compression circuits 1 and 2, the select signals (SEL_314, SEL_315, SEL_3407, SEL_320, and SEL_321) of the selector circuit 312 shown in FIG. 30, respectively, as well as double-speed driving synchronization signals (VCLK_F, HCLK_F, and DTMG_F), respectively.

Figure 32:
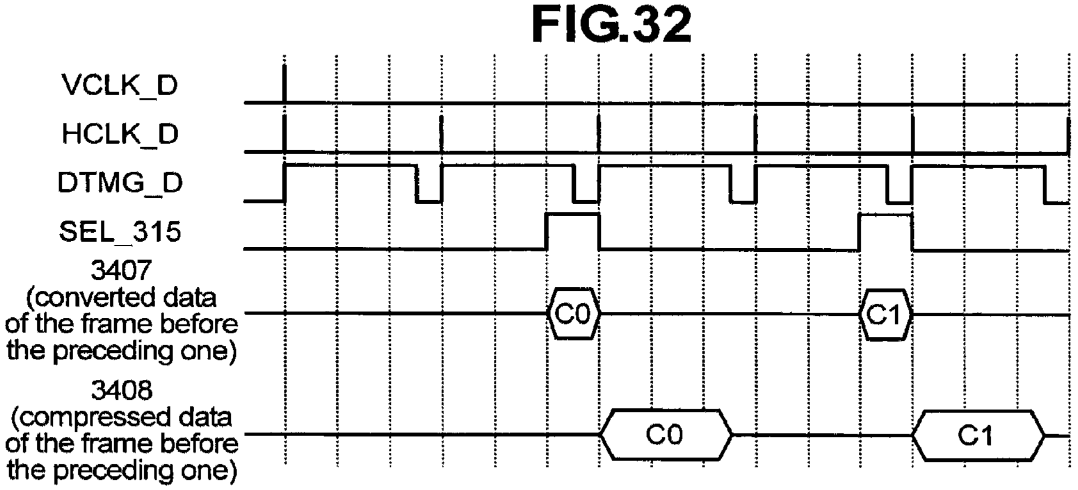
FIG. 32 is a timing chart of the input/output signals of the frequency conversion circuit 5 shown in FIG. 30.

FIG. 32 shows a timing chart of the input/output signals of the frequency conversion circuit 5 shown in FIG. 30. In FIG. 32, according to the read/write timing signal (VCLK_D, HCLK_D, DTMG_D), the frequency conversion circuit 5 obtains the compressed data 3408 of the preceding frame from the converted data 3407 of the preceding frame read from the RAM 203 shown in FIG. 30 synchronously with the select signal SEL_3407. The operation clock frequency of the compressed data 3408 of the frame before the preceding one is 50 MHz and the operation clock frequency of the converted data 3407 of the frame before the preceding one is 113 MHz. This means the frequency is calculated as follows; data compression rate 0.75× the number of R/W operations during the 1H period 3× the input operation clock frequency 50 MHz≈113 MHz.

Figure 33:
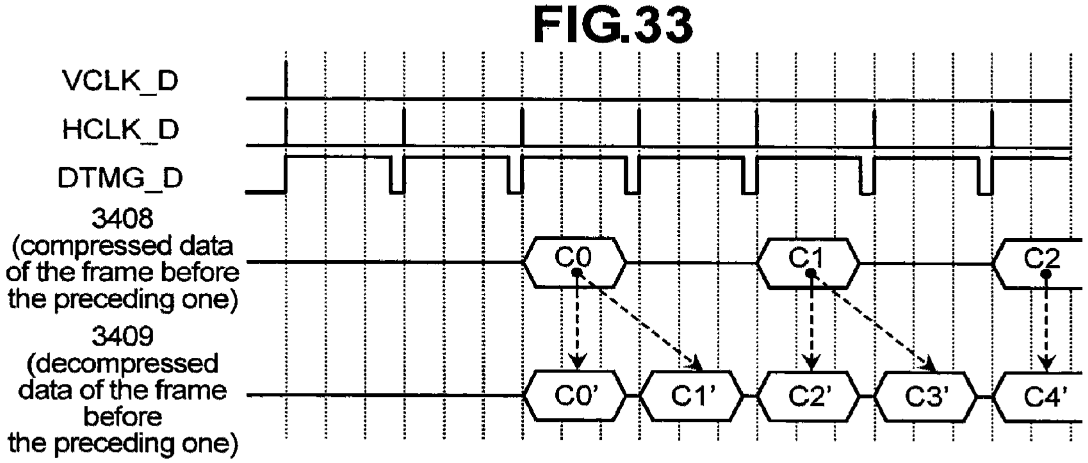
FIG. 33 is a timing chart of the input/output signals of the decompression circuit 3 shown in FIG. 30.

FIG. 33 shows a timing chart of the input/output signals of the decompression circuit 3 shown in FIG. 30. In FIG. 33, according to the read/write timing signal (VCLK_D, HCLK_D, DTMG_D), the decompression circuit 3 decompresses 2-line compressed data 3408 of the frame before the preceding one at each line received from the frequency conversion circuit 5 to obtain the decompressed data 3409 of the frame before the preceding one for each line.

Figure 34:
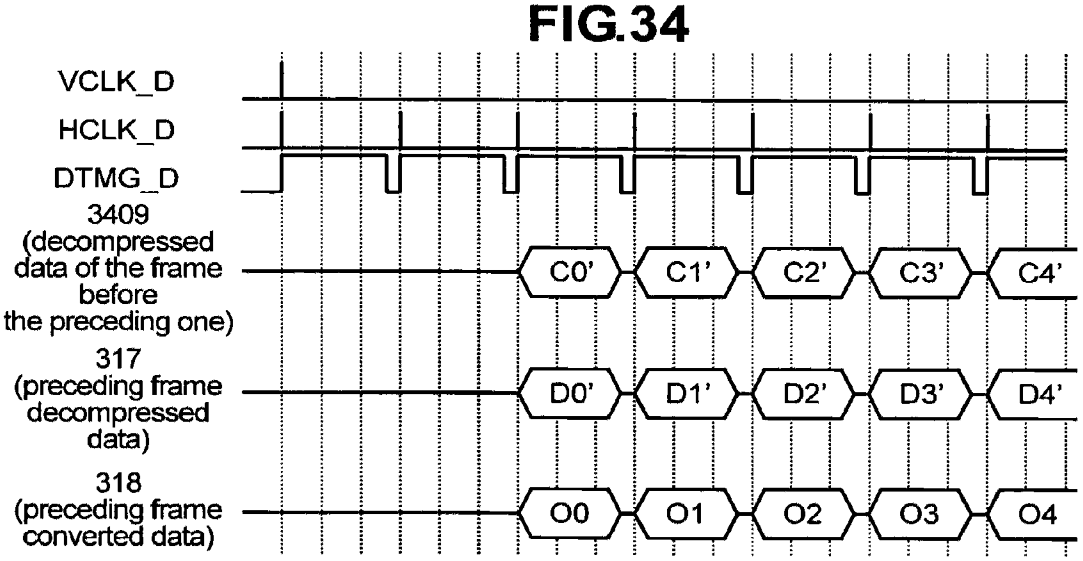
FIG. 34 is a timing chart of the input/output signals of the correction circuit 304 shown in FIG. 30.

FIG. 34 shows a timing chart of the input/output signals of the correction circuit 304 shown in FIG. 30. In FIG. 34, according to the read/write timing signal (VCLK_D, HCLK_D, DTMG_D), the correction circuit 304 calculates the decompressed data 3409 of the frame before the preceding one received from the decompression circuit 3 and the decompressed data 317 of the preceding frame received from the decompression circuit 1 to output the corrected data 318 of the preceding frame.

Figure 35:
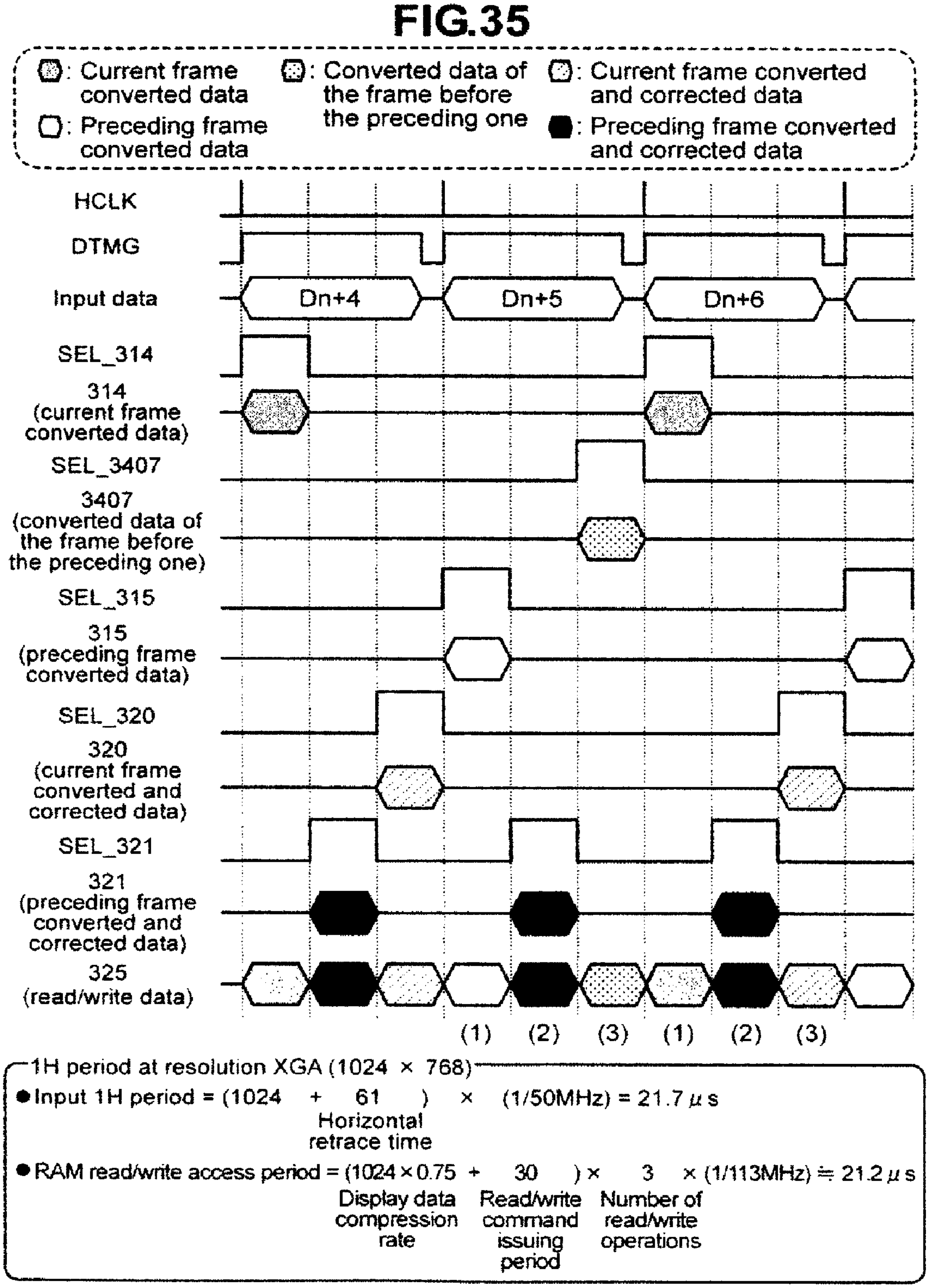
FIG. 35 is still another timing chart of the input/output data bus 325 of the selector circuit 312 shown in FIG. 30.

FIG. 35 shows a timing chart of the input/output signals of the selector circuit 312 shown in FIG. 30. In FIG. 35, according to the read/write timing signal (HCLK_D, DTMG_D) and input data, the selector circuit 312 writes the converted data 314 of the current frame into the RAM 203 synchronously with the select signal SEL_314 and reads the converted data 3407 of the frame before the preceding one from the RAM 203 synchronously with the select signal SEL_3407. The selector circuit 312 also reads the converted data 315 of the preceding frame from the RAM 203 synchronously with the select signal SEL_315 and writes the converted and corrected data 320 of the current frame into the RAM 203 synchronously with the select signal SEL_320. Furthermore, the selector circuit 312 reads the converted and corrected data 321 of the preceding frame from the RAM 203 synchronously with the select signal SEL_321. In such a way, the converted and corrected data 321 of the preceding frame is read from the RAM 203 in each horizontal period as corrected display data.

Accessing the display data in the RAM 203 is made in the following order as shown in FIG. 35. On the first line; (1) preceding frame converted data (read access), (2) preceding frame converted and corrected data (read access), (3) converted data of the frame before the preceding one (read access). On the second line; (1) current frame converted data (write access), (2) preceding frame converted and corrected data (read access), (3) current frame converted data (write access). Hereinafter, the access to the RAM 203 is repeated in this order.

For example, upon inputting display data of the XGA resolution (1024 dots (+horizontal return time 61 dots)×768 lines), the 1H period inputted from the CPU is 1085×(1/50 MHz)=21.7 μs. On the other hand, each of the display data and the corrected data to be accessed in the RAM 203 will become 1024×0.75=768. Furthermore, if the read/write command issuing period with respect to a general RAM is about 30 clocks, the result will become (768×3+30×3)×(1/113 MHz)≈21.2 μs, so that the read/write access time with respect to the RAM 203 will thus be fit within the 1H period inputted from the CPU.

FIGS. 36 through 40 show timing charts of the signals of the compression circuits 1 and 2 when the YUV411 compression method is employed for those circuits 1 and 2, respectively.

Figure 36:
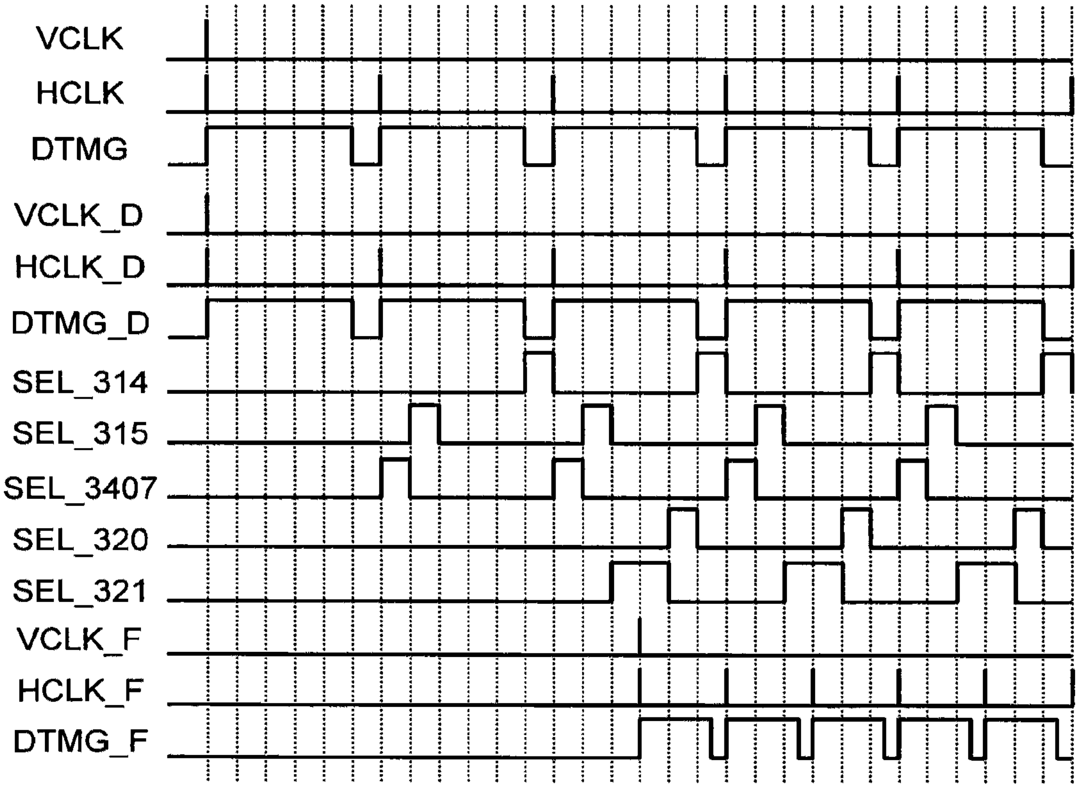
FIG. 36 is a timing chart of the signals generated by the control signal generation circuit 301 shown in FIG. 30, which divides one H period into six sub-periods to generate those signals.

FIG. 36 shows a timing chart of the signals generated in the control signal generation circuit 301 shown in FIG. 30. The circuit 301 divides one 1H period into 6 sub-periods to generate those signals. In FIG. 36, according to the input synchronization signals (VCLK, HCLK, and DTMG), the control signal generation circuit 301 generates the read/write timing signals (VCLK_D, HCLK_D, and DTMG_D) of each of the line memories of the compression circuits 1 and 2, the select signals (SEL_314, SEL_315, SEL_3407, SEL_320, and SEL_321) of the selector circuit 312 shown in FIG. 30, respectively, as well as the double-speed driving synchronization signals (VCLK_F, HCLK_F, and DTMG_F), respectively.

Figure 37:
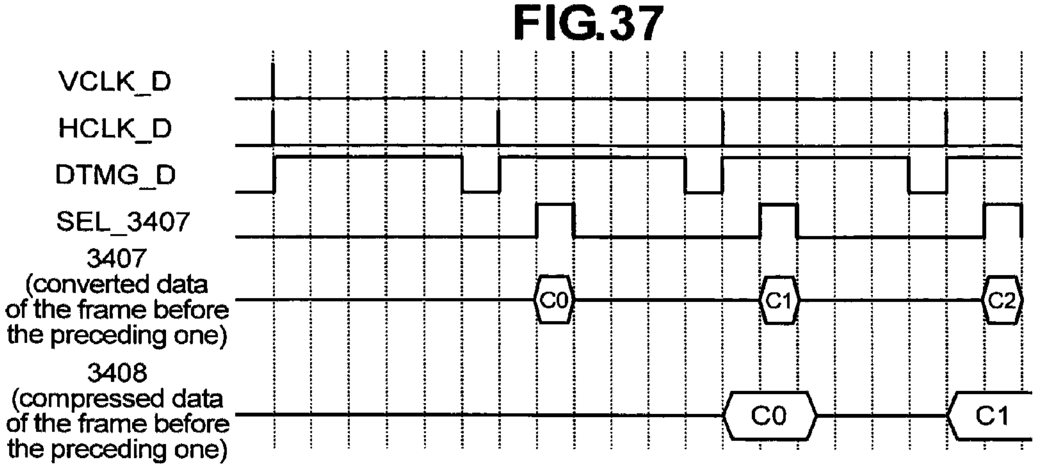
FIG. 37 is a timing chart of the input/output signals of the frequency conversion circuit 5 shown in FIG. 30.

FIG. 37 shows a timing chart of the input/output signals of the frequency conversion circuit 5 shown in FIG. 30. In FIG. 37, according to the read/write timing signal (VCLK_D, HCLK_D, DTMG_D), the frequency conversion circuit 5 obtains the compressed data 3408 of the frame before the preceding one from the converted data 3407 of the frame before the preceding one read from the RAM 203 shown in FIG. 30 synchronously with the select signal SEL_3407. The operation clock frequency of the compressed data 3408 of the frame before the preceding one is 50 MHz and that of the converted data 3407 of the frame before the preceding one is 150 MHz. This means that the frequency is calculated as data compression rate 0.5× the number of R/W operations during the 1H period 6× input operation clock frequency 50 MHz=150 MHz.

Figure 38:
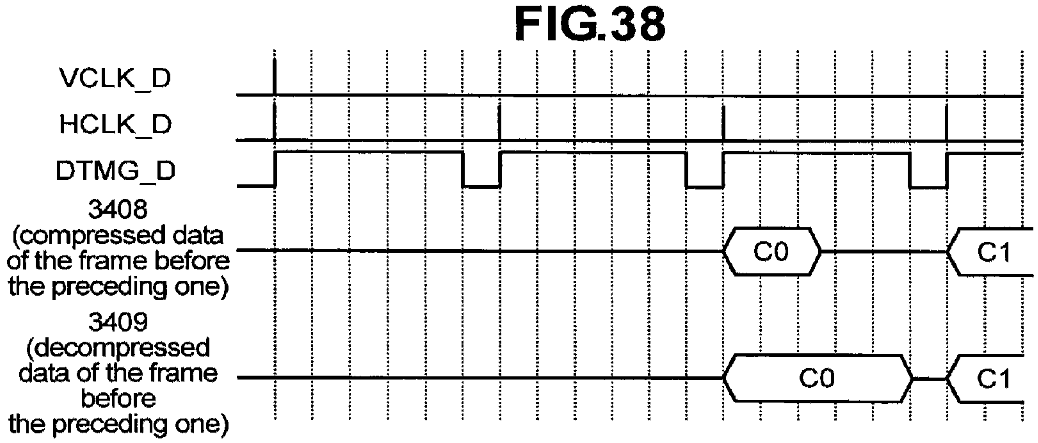
FIG. 38 is a timing chart of the input/output signals of a decompression circuit 3 shown in FIG. 30.

FIG. 38 shows a timing chart of the input/output signals of the decompression circuit 3 shown in FIG. 30. In FIG. 38, according to the read/write timing signal (VCLK_D, HCLK_D, DTMG_D), the decompression circuit 3 decompresses the compressed data 3408 of the frame before the preceding one received from the frequency conversion circuit 5 to obtain the decompressed data 3409 of the frame before the preceding one.

Figure 39:
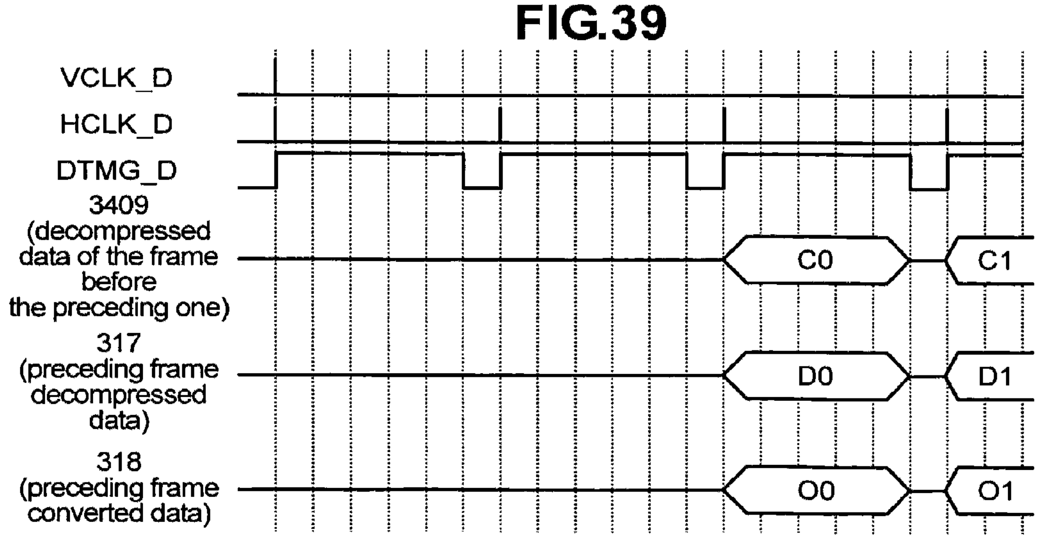
FIG. 39 is another timing chart of the input/output signals of the correction circuit 304 shown in FIG. 30.

FIG. 39 shows a timing chart of the input/output signals of the correction circuit 304 shown in FIG. 30. In FIG. 39, according to the read/write timing signal (VCLK_D, HCLK_D, DTMG_D), the correction circuit 304 calculates the decompressed data 3409 of the frame before the preceding one received from the decompression circuit 3 and the decompressed data 317 of the preceding frame received from the decompression circuit 1 to output the corrected data 318 of the preceding frame.

Figure 40:
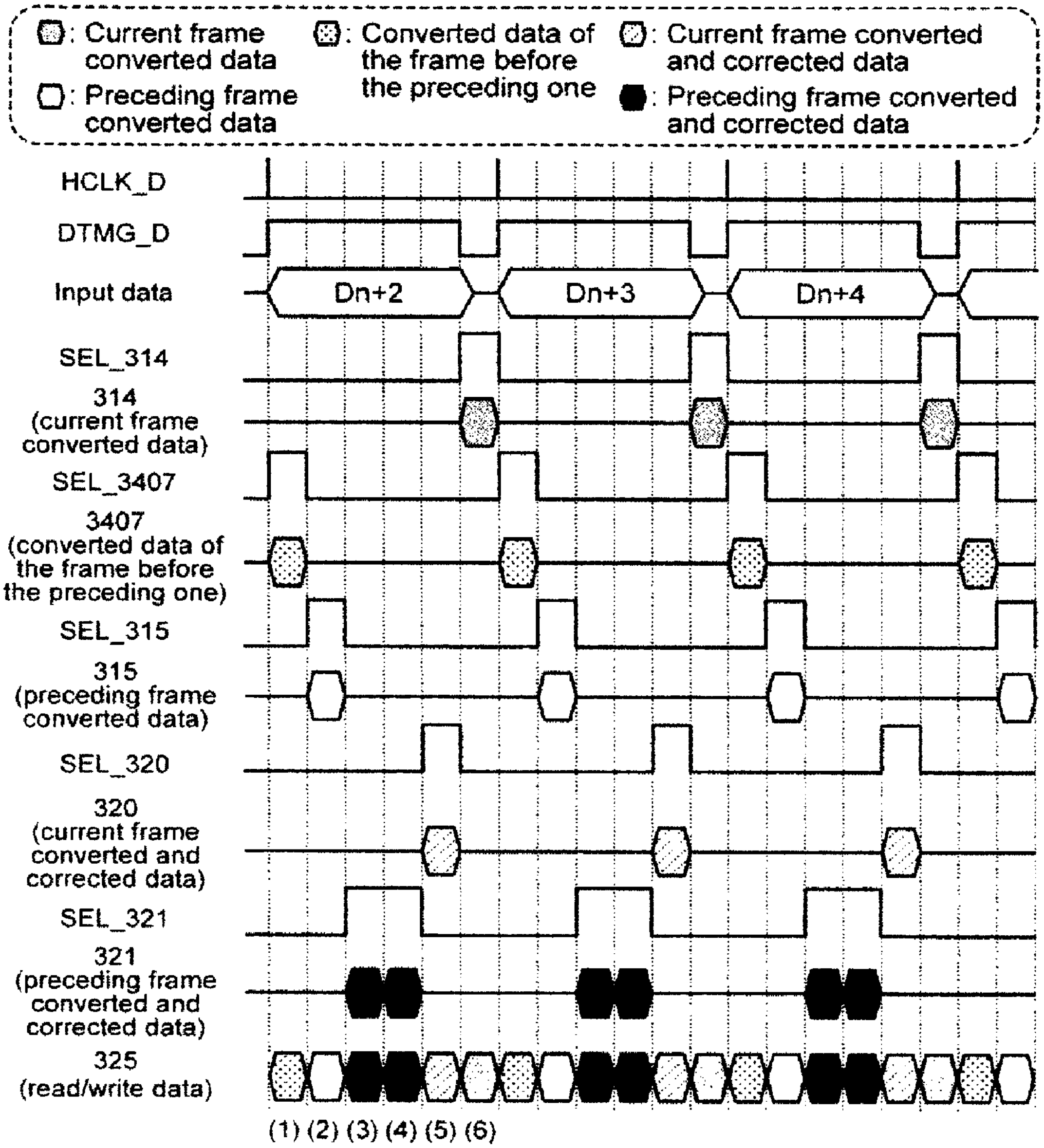
FIG. 40 is still another timing chart of the input/output data bus 325 of the selector circuit 312 shown in FIG. 30.

FIG. 40 shows a timing chart of the input/output signals of the selector circuit 312 shown in FIG. 30. In FIG. 40, according to the read/write timing signal (HCLK_D, DTMG_D) and input data, the selector circuit 312 writes the converted data 314 of the current frame into the RAM 203 synchronously with the select signal SEL_314 and reads the converted data 3407 of the frame before the preceding one from the RAM 203 synchronously with the select signal SEL_3407. Furthermore, the selector circuit 312 reads the converted data 315 of the preceding frame from the RAM 203 synchronously with the select signal SEL_315, writes the converted and corrected data 320 of the current frame into the RAM 203 synchronously with the select signal SEL_320, and reads the converted and corrected data 321 of the preceding frame from the RAM 203 synchronously with the select signal SEL_321. In such a way, the converted and corrected data 321 of the preceding frame is read from the RAM 203 in each horizontal period as corrected display data.

Accessing the display data in the RAM 203 is made in the following order; (1) converted data of the frame before the preceding one (read access), (2) preceding frame converted data (read access), (3) preceding frame converted and corrected data (read access), (4) preceding frame converted and corrected data (write access), (5) current frame converted and corrected data (write access), and (6) current frame converted data (write access). Hereinafter, the access to the RAM 203 is repeated in this order.

For example, upon inputting display data of the XGA resolution (1024 dots (+horizontal return time 61 dots)×768 lines), the 1H period inputted from the CPU is 1085×(1/50 MHz)=21.7 μs. On the other hand, each of the display data and the corrected data to be accessed in the RAM 203 during this 1H period is 1024×0.5=512. Furthermore, if the read/write command issuing period with respect to a general RAM is about 30 clocks, the result will become (512×6+30×6)×(1/150 MHz)=21.7 μs, so that the read/write access time with respect to the RAM 203 will thus be fit within the 1H period inputted from the CPU.

Although the BTC compression method or the YUV411 compression method is employed in this embodiment, the compression method may not be limited only to that one. For example, there will arise no problem even when another compression method that, for example compresses display data in units of two lines or for each line is employed. And the RAM in this embodiment is required to have a storage area used for the frame before the preceding one, so that the RAM comes to include at least three or more banks.

Fifth Embodiment

Figure 41:
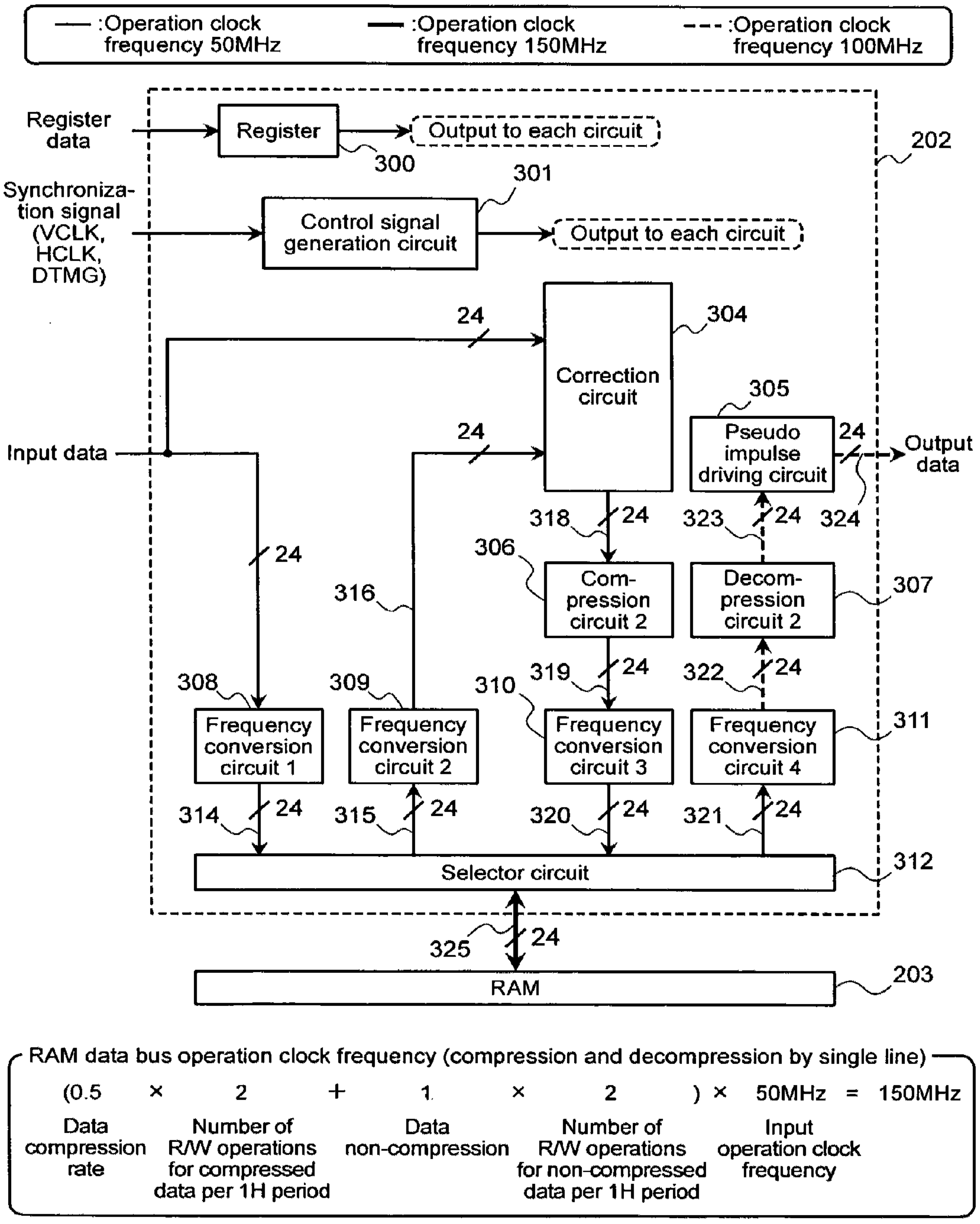
FIG. 41 is still another configuration of the image processing circuit 202 shown in FIG. 1.

FIG. 41 shows another configuration of the image processing circuit 202 shown in FIG. 1. In this fifth embodiment, the compression circuit 2 compressed only the corrected data 318 received from the correction circuit 304 according to the YUV411 compression method. Other components in the configuration are the same as those shown in FIG. 2.

Figure 42:
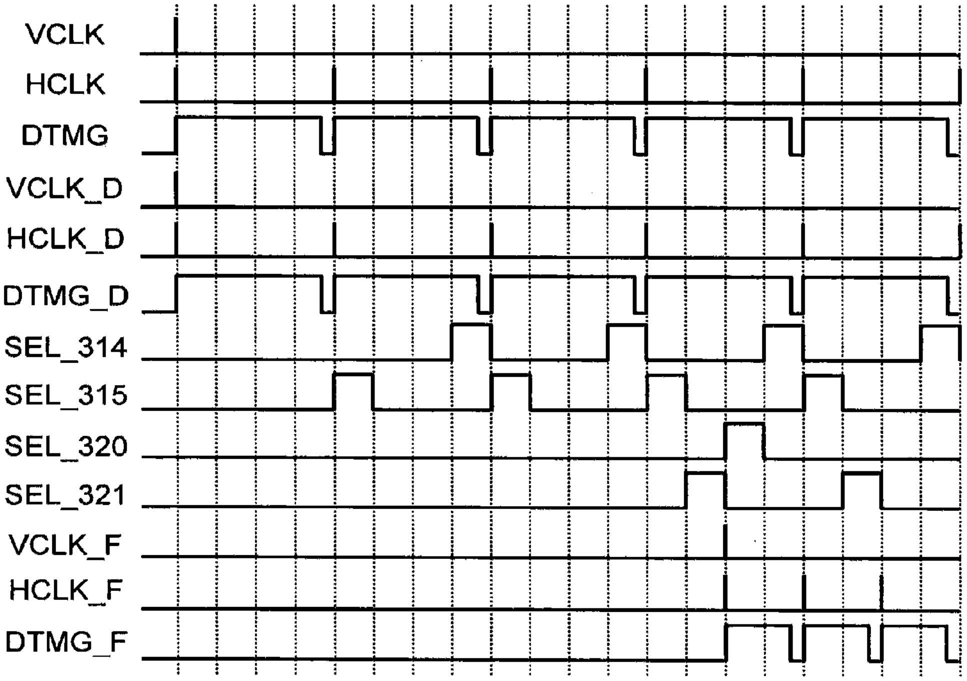
FIG. 42 is a timing chart of the signals generated by the control signal generation circuit 301 shown in FIG. 41, which divides one H period into four sub-periods to generate those signals.

FIG. 42 shows a timing chart of the signals generated in the control signal generation circuit 301 shown in FIG. 41. The circuit 301 divides one 1H period into four sub-periods to generate those signals. In FIG. 42, according to the input synchronization signals (VCLK, HCLK, and DTMG), the control signal generation circuit 301 generates the read/write timing signals (VCLK_D, HCLK_D, and DTMG_D) of the line memory of the compression circuit 2, the select signals (SEL_314, SEL_315, SEL_320, and SEL_321) of the selector circuit shown in FIG. 41, respectively, as well as the double-speed driving synchronization signals (VCLK_F, HCLK_F, and DTMG_F), respectively.

Figure 43:
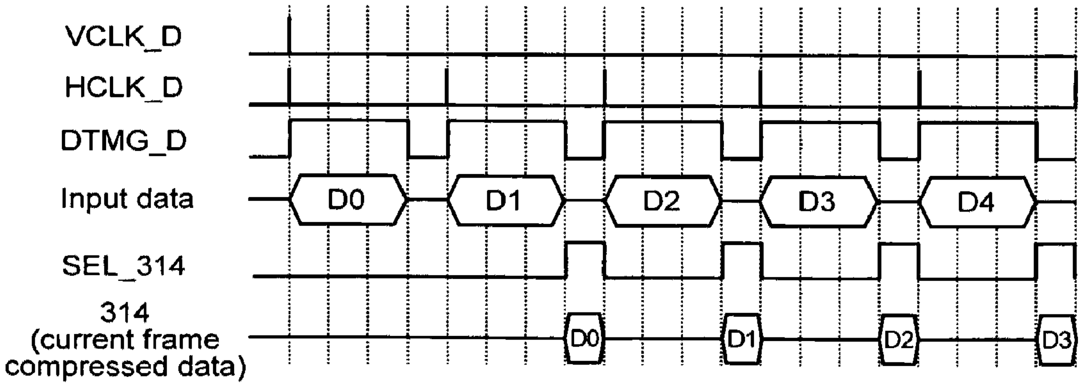
FIG. 43 is a timing chart of the input/output signals of the frequency conversion circuit 1 shown in FIG. 41.

FIG. 43 shows a timing chart of the input/output signals of the frequency conversion circuit 1 shown in FIG. 41. In FIG. 43, according to the read/write timing signal (VCLK_D, HCLK_D, DTMG_D), the frequency conversion circuit 1 obtains the converted data 314 of the current frame from input data synchronously with the select signal SEL_314. The operation clock frequency of the input data is 50 MHz and that of the converted data 314 of the current frame is 150 MHz. This converted data 314 of the current frame is written into the RAM 203 shown in FIG. 41.

Figure 44:
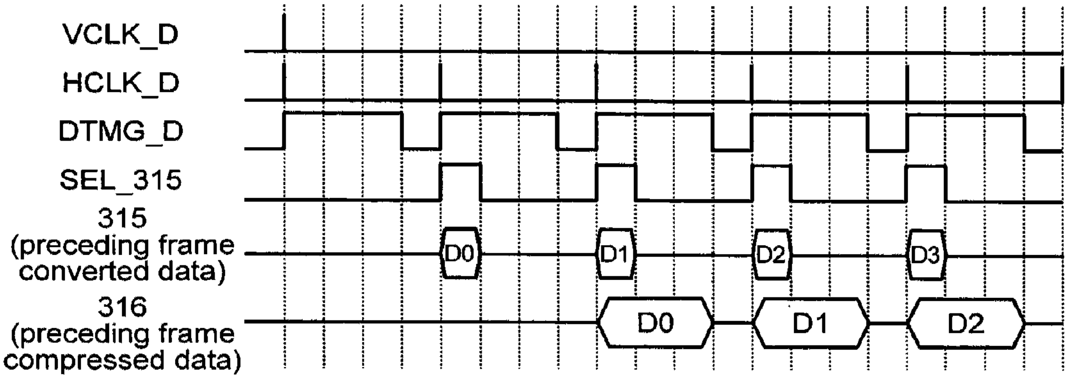
FIG. 44 is a timing chart of the input/output signals of the frequency conversion circuit 2 shown in FIG. 41.

FIG. 44 shows a timing chart of the input/output signals of the frequency conversion circuit 2 shown in FIG. 41. In FIG. 44, according to the read/write timing signal (VCLK_D, HCLK_D, DTMG_D), the frequency conversion circuit 1 obtains the compressed data 316 of the preceding frame from the converted data 315 of the preceding frame read from the RAM 203 shown in FIG. 41 synchronously with the select signal SEL_315. The operation clock frequency of the converted data 315 of the preceding frame is 150 MHz and that of the compressed data 316 of the preceding frame is 50 MHz.

Figure 45:
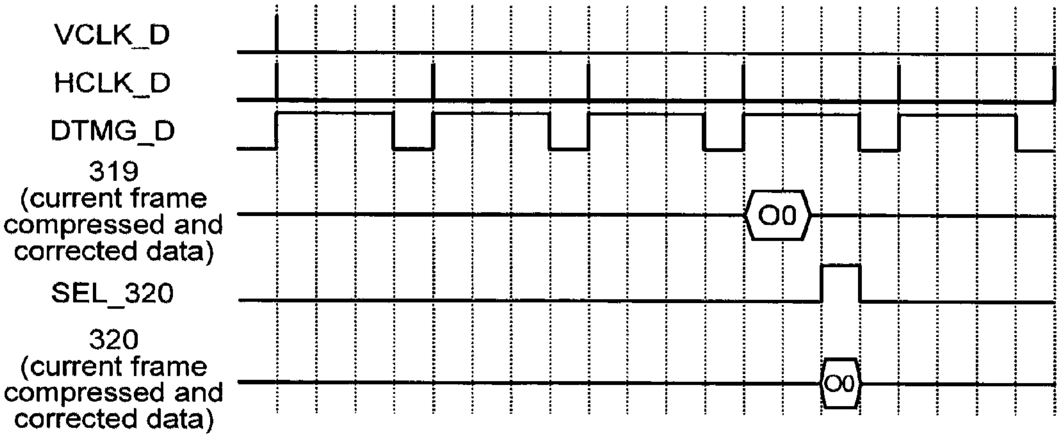
FIG. 45 is a timing chart of the input/output signals of the frequency conversion circuit 3 shown in FIG. 41.

FIG. 45 shows a timing chart of the input/output signals of the frequency conversion circuit 3 shown in FIG. 41. In FIG. 45, according to the read/write timing signal (VCLK_D, HCLK_D, DTMG_D), the frequency conversion circuit 3 obtains the converted and corrected data 320 of the current frame from the compressed and corrected data 319 of the current frame received from the compression circuit 2 synchronously with the select signal SEL_320. The operation clock frequency of the compressed and corrected data 319 of the current frame is 50 MHz and that of the converted and corrected data 320 of the current frame is 150 MHz. This converted and corrected data 320 of the current frame is written into the RAM 203 shown in FIG. 2.

Figure 46:
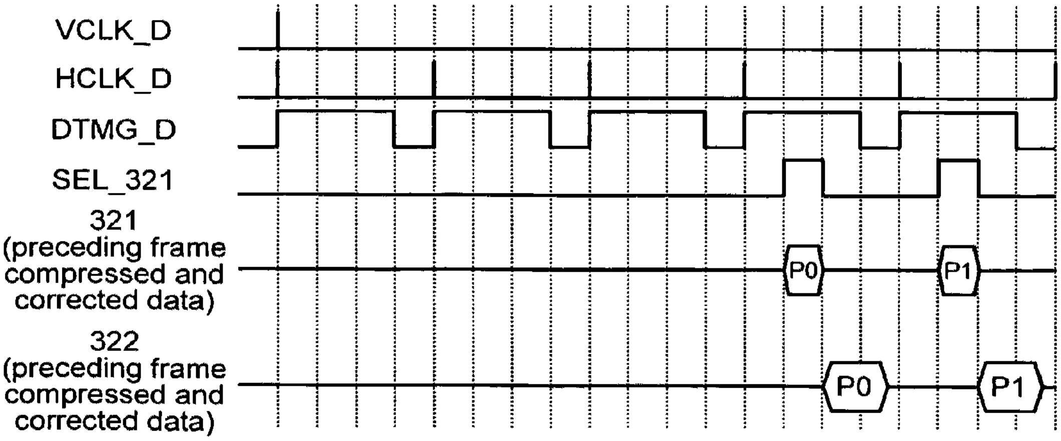
FIG. 46 is a timing chart of the input/output signals of the frequency conversion circuit 4 shown in FIG. 41.

FIG. 46 shows a timing chart of the input/output signals of the frequency conversion circuit 4 shown in FIG. 41. In FIG. 46, according to the read/write timing signal (VCLK_D, HCLK_D, DTMG_D), the frequency conversion circuit 4 obtains the compressed and corrected data 322 of the preceding frame from the converted and corrected data 321 of the preceding frame read from the RAM 203 shown in FIG. 41 synchronously with the select signal SEL_321. The operation clock frequency of the converted and corrected data 321 of the preceding frame is 150 MHz and that of the compressed and corrected data 322 of the preceding frame is 100 MHz.

Figure 47:
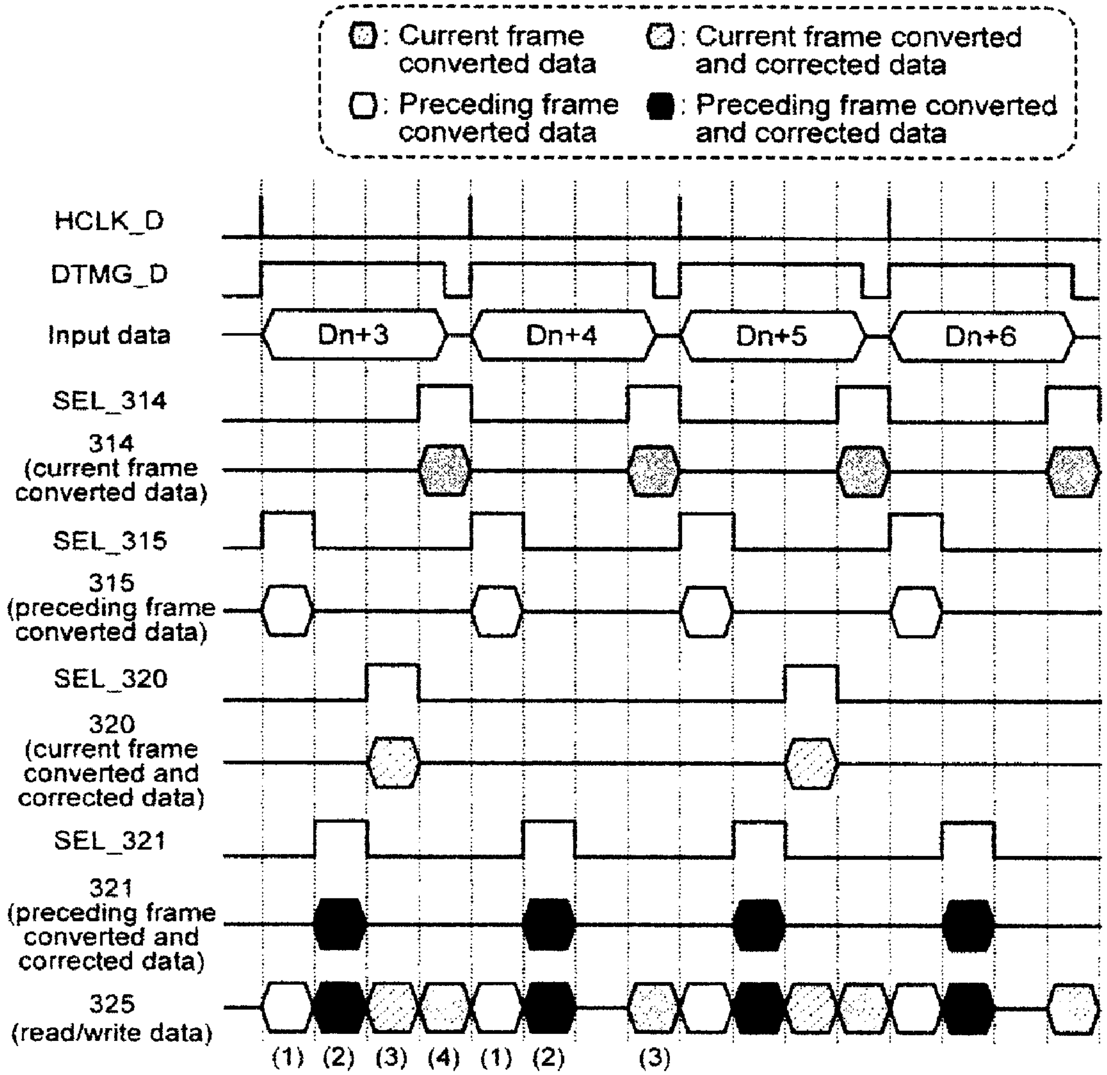
FIG. 47 is a timing chart of the input/output data bus 325 of a selector circuit 312 shown in FIG. 41.

FIG. 47 shows a timing chart of the input/output data bus 325 of the selector circuit 312 shown in FIG. 41. In FIG. 47, according to the read/write timing signal (HCLK_D, DTMG_D) and input data, the selector circuit 312 writes the converted data 314 of the current frame into the RAM 203 synchronously with the select signal SEL_314 and reads the converted data 315 of the preceding frame from the RAM 203 synchronously with the select signal SEL_315. The selector circuit 312 also writes the converted and corrected data 320 of the current frame into the RAM 203 synchronously with the select signal SEL_320 and reads the converted and corrected data 321 of the preceding frame from the RAM 203 synchronously with the select signal SEL_321. In such a way, the converted and corrected data 321 of the preceding frame is read from the RAM 203 in each horizontal period as corrected display data.

Accessing the display data in the RAM 203 is made in the following order as shown in FIG. 47. On the first line; (1) preceding frame converted data, (2) preceding frame converted and corrected data, (3) current frame converted and corrected data, (4) current frame converted data. On the second line; (1) preceding frame converted data, (2) preceding frame converted and corrected data, and (3) current frame converted data. Hereinafter, the access to the RAM 203 is repeated in the same order.

For example, upon inputting display data of the XGA resolution (1024 dots (+horizontal return time 61 dots)×768 lines), the 1H period inputted from the CPU is 1085×(1/50 MHz)=21.7 μs. On the other hand, the corrected data to be accessed in the RAM 203 during this 1H period is 1024×0.5=512. Furthermore, if the read/write command issuing period with respect to a general RAM is about 30 clocks, the result will become ((512+30)×2+(1024+30)×2)×(1/150 MHz)≈21.3 μs, so that the read/write access time with respect to the RAM 203 will thus be fit within the 1H period inputted from the CPU. And although the BTC compression method is employed in this fifth embodiment, the compression method is not limited only to that one. For example, there will arise no problem even when another compression method that, for example, compresses display data in units of two lines is employed and the compression rate of display data is 0.5 or under.

Sixth Embodiment

In this sixth embodiment, the BTC compression method in the first embodiment is employed for the compression circuit 1 shown in FIG. 2 and the YUV411 compression method in the second embodiment is employed for the compression circuit 2. In this sixth embodiment, the operation clock frequency of the data bus of the RAM 203 is 113 MHz. In other words, the operation clock frequency is calculated as (0.75×1+0.5×3)×50 MHz 113 MHz if it is assumed that the data compression rate is 0.75 in the compression circuit 1 that employs the BTC compression method and the number of R/W operations during one 1H period of the compressed data is once while the data compression rate is 0.5 in the compression circuit 2 that employs the YUV411 compression method and the number of R/W operations during one 1H period of the compressed data is three times, and the input operation clock frequency is 50 MHz, respectively. Other operations are the same as those in the first embodiment.

Figure 48:
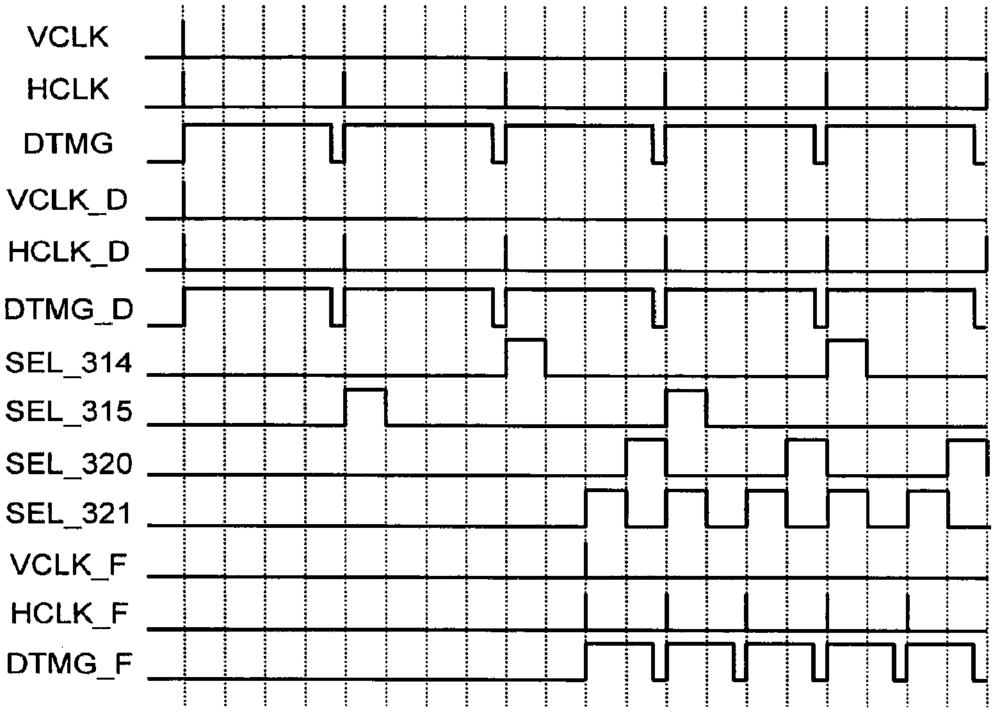
FIG. 48 is another timing chart of the signals generated by the control signal generation circuit 301 shown in FIG. 2, which divides one H period into four sub-periods to generate those signals.

FIG. 48 shows a timing chart of the signals generated in the control signal generation circuit 301 shown in FIG. 2. The circuit 301 divides one 1H period into four sub-periods to generate those signals. In FIG. 24, according to the input synchronization signals (VCLK, HCLK, and DTMG), the control signal generation circuit 301 generates the read/write timing signals (VCLK_D, HCLK_D, and DTMG_D) of each of the line memories of the compression circuits land 2, the select signals (SEL_314, SEL_315, SEL_320, and SEL_321) of the selector signal shown in FIG. 2, respectively, as well as the double-speed driving synchronization signals (VCLK_F, HCLK_F, and DTMG_F), respectively.

Figure 49:
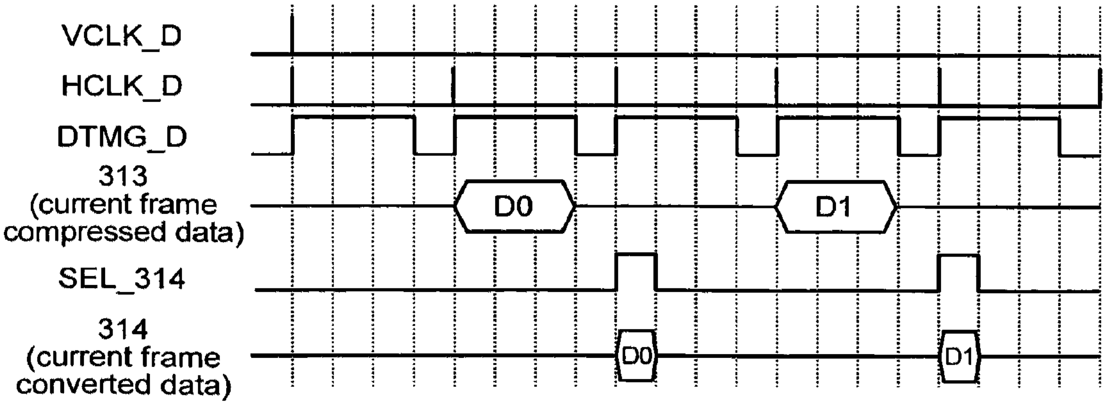
FIG. 49 is another timing chart of the input/output signals of the frequency conversion circuit 1 shown in FIG. 2.

FIG. 49 shows a timing chart of the input/output signals of the frequency conversion circuit 1 shown in FIG. 2. In FIG. 49, according to the read/write timing signal (VCLK_D, HCLK_D, DTMG_D), the frequency conversion circuit 1 obtains the converted data 314 of the current frame from the 2-line compressed data 313 of the current frame at each line synchronously with the select signal SEL_314. The operation clock frequency of the compressed data 313 of the current frame is 50 MHz and that of the converted data 314 of the current frame is 113 MHz. This converted data 314 of the current frame is written into the RAM 203 shown in FIG. 2.

Figure 50:
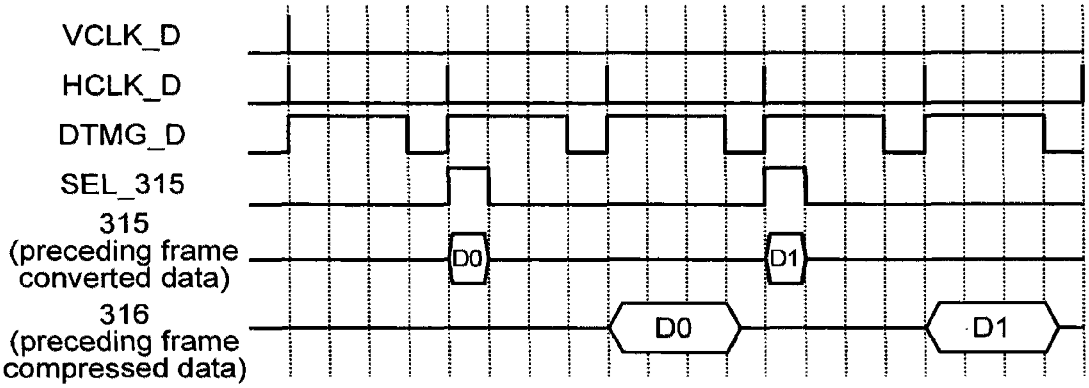
FIG. 50 is another timing chart of the input/output signals of the frequency conversion circuit 2 shown in FIG. 2.

FIG. 50 shows a timing chart of the input/output signals of the frequency conversion circuit 2 shown in FIG. 2. In FIG. 26, according to the read/write timing signal (VCLK_D, HCLK_D, DTMG_D), the frequency conversion circuit 2 obtains the compressed data 316 of the preceding frame from the converted data 315 of the preceding frame read from the RAM 203 shown in FIG. 2 synchronously with the select signal SEL_315. The operation clock frequency of the converted data 315 of the preceding frame is 113 MHz and that of the compressed data 316 of the preceding frame is 50 MHz.

Figure 51:
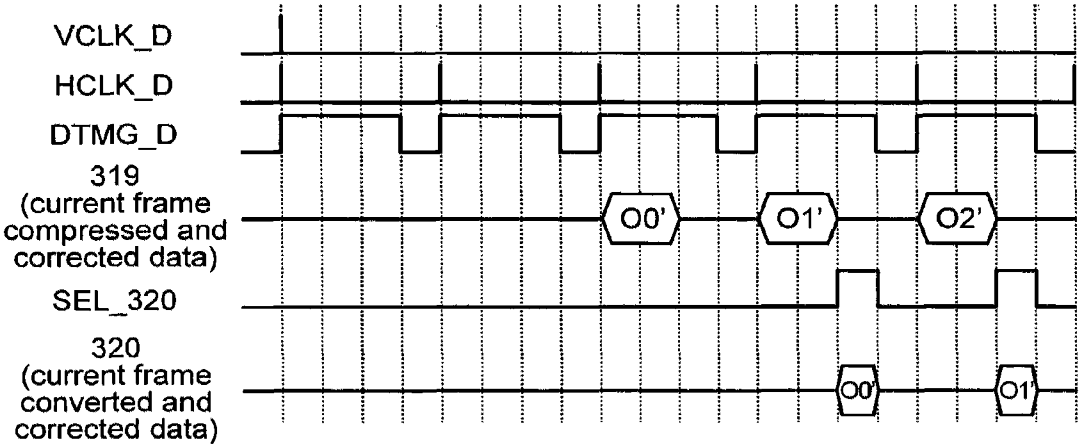
FIG. 51 is another timing chart of the input/output signals of the frequency conversion circuit 3 shown in FIG. 2.

FIG. 51 shows a timing chart of the input/output signals of the frequency conversion circuit 3 shown in FIG. 2. In FIG. 27, according to the read/write timing signal (VCLK_D, HCLK_D, DTMG_D), the frequency conversion circuit 3 obtains the converted and corrected data 320 of the current frame from the compressed and corrected data 319 of the current frame received from the compression circuit 2 synchronously with the select signal SEL_320. The operation clock frequency of the compressed and corrected data 319 of the current frame is 50 MHz and that of the converted and corrected data 320 of the current frame is 113 MHz. This converted and corrected data 320 of the current frame is written into the RAM 203 shown in FIG. 2.

Figure 52:
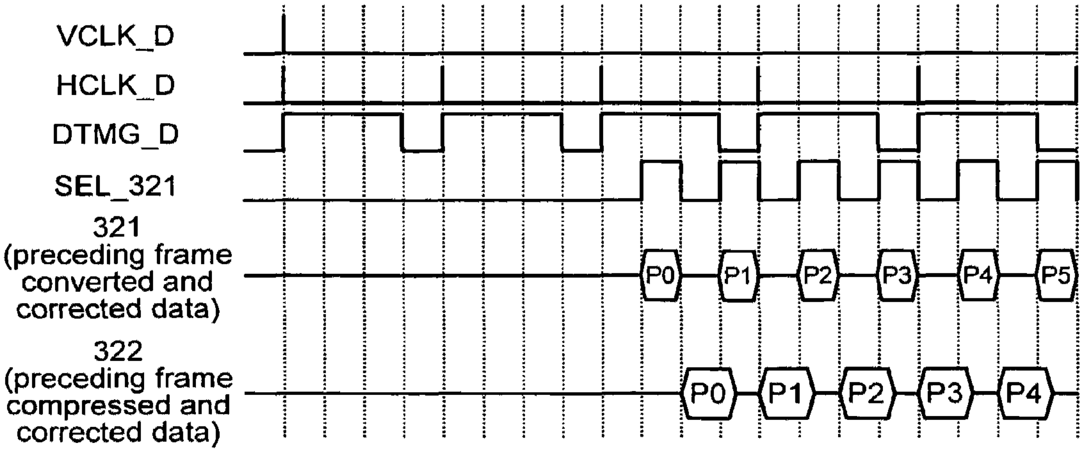
FIG. 52 is another timing chart of the input/output signals of the frequency conversion circuit 4 shown in FIG. 2.

FIG. 52 shows a timing chart of the input/output signals of the frequency conversion circuit 4 shown in FIG. 2. In FIG. 28, according to the read/write timing signal (VCLK_D, HCLK_D, DTMG_D), the frequency conversion circuit 4 obtains the 1-line compressed and corrected data 322 of the preceding frame used for double-speed driving, respectively from the 2-line converted and corrected data 321 of the preceding frame read from the RAM 203 shown in FIG. 2 synchronously with the select signal SEL_321. The operation clock frequency of the converted and corrected data 321 of the preceding frame is 113 MHz and that of the compressed and corrected data 322 of the preceding frame is 100 MHz.

Figure 53:
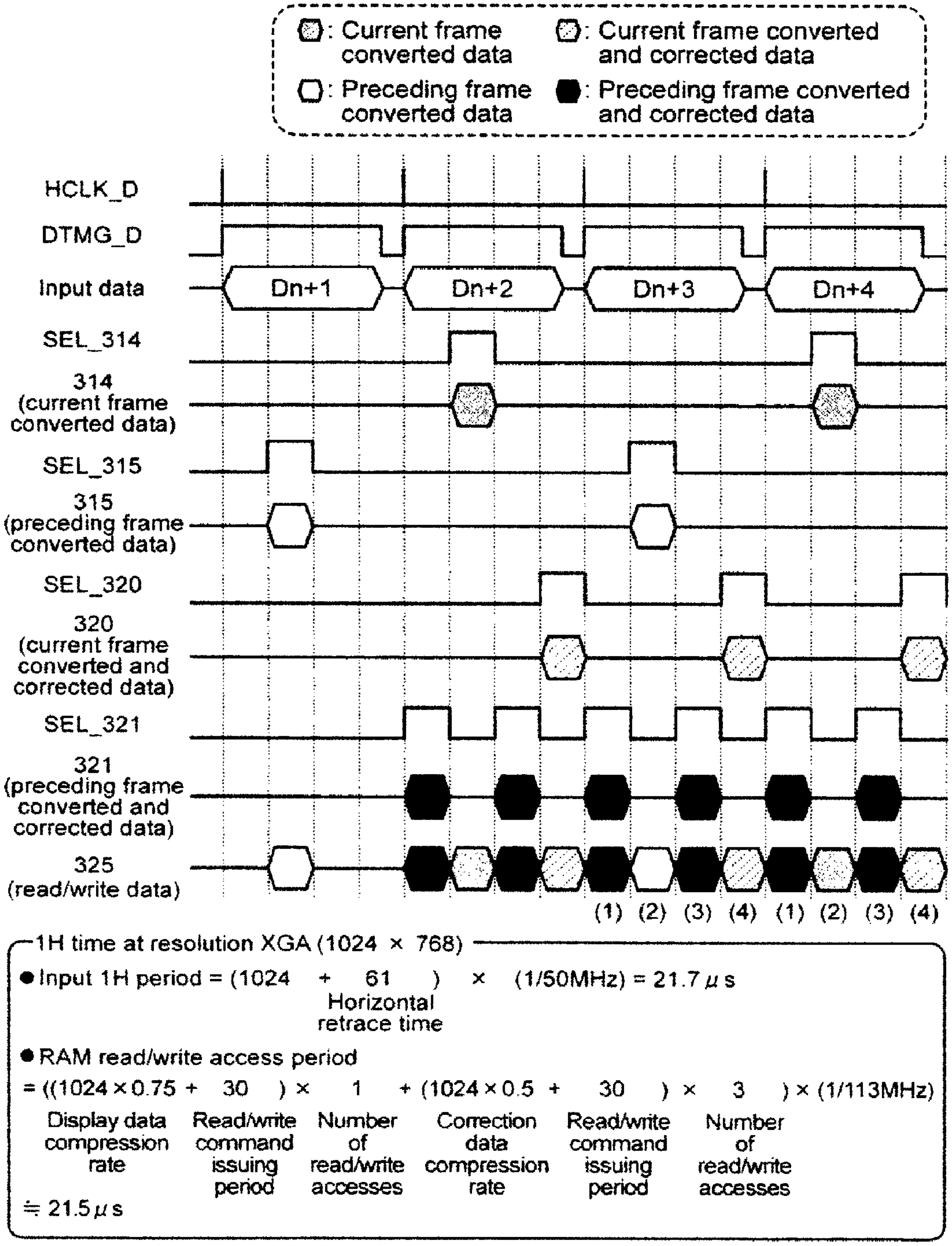
FIG. 53 is another timing chart of the input/output data bus 325 of the selector circuit 312 shown in FIG. 2.

FIG. 53 shows a timing chart of the input/output data bus 325 of the selector circuit 312 shown in FIG. 2. In FIG. 53, according to the read/write timing signal (VCLK_D, HCLK_D, DTMG_D) and input data, the selector circuit 312 writes the converted data 314 of the current frame into the RAM 203 synchronously with the select signal SEL_314 and reads the converted data 315 of the preceding frame from the RAM 203 synchronously with the select signal SEL_315. The selector circuit 312 also writes the converted and corrected data 320 of the current frame into the RAM 203 synchronously with the select signal SEL_320 and reads the 2-line converted and corrected data 321 of the preceding frame from the RAM 203 synchronously with the select signal SEL_321. In such a way, the 2-line converted and corrected data 321 of the preceding frame is read twice from the RAM 203 in each horizontal period as corrected display data.

Accessing the display data in the RAM 203 is made in the following order as shown in FIG. 53. On the first line; (1) preceding frame converted and corrected data (read access), (2) preceding frame converted data (read access), (3) preceding frame converted and corrected data (read access), and (4) current frame converted and corrected data (write access). On the second line; (1) preceding frame converted and corrected data (read access), (2) current frame converted data (write access), (3) preceding frame converted and corrected data (read access), and (4) current frame converted and corrected data (write access). Hereinafter, the access to the RAM 203 is repeated in this order.

For example, upon inputting display data of the XGA resolution (1024 dots (+horizontal return time 61 dots)×768 lines), the 1H period inputted from the CPU is 1085×(1/50 MHz)=21.7 μs. On the other hand, each of the display data and the corrected data to be accessed in the RAM 203 during this 1H period is calculated as 1024×0.75=768 and 1024×0.5=512, respectively. Furthermore, if the read/write command issuing period with respect to a general RAM is about 30 clocks, the result will become (768×1+512×3+30×4)×(1/113 MHz)≈21.5 μs, so that the read/write access time with respect to the RAM 203 will thus be fit within the 1H period inputted from the CPU.

As described above, therefore, both the display data correction and the pseudo impulse driving can be made with use of only one RAM even when the BTC compression method is employed for the compression circuit 1 and the YUV411 compression method is employed for the compression circuit 2. Although the BTC compression method and the YUV411 compression method are employed in this sixth embodiment, the compression methods are not limited only to those. For example, there will arise no problem even when display data is compressed in units of two lines or for each line and the compression rate of display data is 0.75 or 0.5 or under.

What is claimed is:

1. A display device, including an image processing circuit that outputs data by making at least four times of read/write accessing to a storage circuit that stores input data, as well as corrected input data, wherein a read/write accessing time that includes a read access time with respect to the output data is within a one-line period inputted from an external CPU, wherein the data to be written to the storage circuit comprises current frame input data and current frame corrected data while the data to be read from the storage circuit comprises preceding frame input data and preceding frame corrected data, and wherein the read/write accesses to a bus of the storage circuit is made in the order of the preceding frame input data and the preceding frame corrected data on the first line and the current frame input data, the preceding frame corrected data, and the current frame corrected data on the second line.

2. A display device, including an image processing circuit that outputs data by making at least four times of read/write accessing to a storage circuit that stores input data, as well as corrected input data, wherein a read/write accessing time that includes a read access time with respect to the output data is within a one-line period inputted from an external CPU, wherein the data to be written to the storage circuit comprises current frame input data and current frame corrected data while the data to be read from the storage circuit comprises preceding frame input data and preceding frame corrected data, wherein the read/write accesses to the bus of the storage circuit are made in the order of the preceding frame input data, the preceding frame corrected data, the preceding frame corrected data, and the current frame corrected data on the first line and the current frame input data, the preceding frame corrected data, the preceding frame corrected data, and the current frame corrected data on the second line.

3. A display device, including an image processing circuit that outputs data by making at least four times of read/write accessing to a storage circuit that stores input data, as well as corrected input data, wherein a read/write accessing time that includes a read access time with respect to the output data is within a one-line period inputted from an external CPU, wherein the data to be written to the storage circuit comprises current frame input data and current frame corrected data while the data to be read from the storage circuit comprises preceding frame input data and preceding frame corrected data, and wherein the read/write accesses to the bus of the storage circuit are made in the order of the preceding frame input data, the preceding frame corrected data, the current frame corrected data, and the current frame input data on the first line and the preceding frame input data, the preceding frame corrected data, and the current frame input data on the second line.

4. A display device, including an image processing circuit that outputs data by making at least four times of read/write accessing to a storage circuit that stores input data, as well as corrected input data, wherein a read/write accessing time that includes a read access time with respect to the output data is within a one-line period inputted from an external CPU, wherein the data to be written to the storage circuit comprises the current frame input data and the current frame corrected data and the data to be read from the storage circuit comprises the preceding frame input data, the input data of the frame before the preceding one and the preceding frame corrected data, and wherein the read/write accesses to the bus of the storage circuit are made in the order of the preceding frame input data, the preceding frame corrected data, and the input data of the frame before the preceding one on the first line and the current frame input data, the preceding frame corrected data, and the current frame corrected data on the second line.

5. A display device, including an image processing circuit that outputs data by making at least four times of read/write accessing to a storage circuit that stores input data, as well as corrected input data, wherein a read/write accessing time that includes a read access time with respect to the output data is within a one-line period inputted from an external CPU, wherein the data to be written to the storage circuit means comprises current frame input data and current frame corrected data while the data to be read from the storage circuit comprises preceding frame input data and preceding frame corrected data, and wherein the read/write accesses to the bus of the storage circuit are made in the order of the preceding frame corrected data, the preceding frame input data, the preceding frame corrected data, and the current frame corrected data on the first line and the preceding frame corrected data, the current frame input data, the preceding frame corrected data, and the current frame corrected data on the second line.

6. The display device according to claim 5 further includes a compression circuit that is configured compress to input data in units of two lines and that outputs the compressed input data of every other line, wherein the compressed input data output from the compression circuit is written to the storage circuit.

7. The display device according to claim 5 further includes a compression circuit that is configured compress to every line input data and that outputs every line compressed input data, wherein the every line compressed input data output from the compression circuit is written to the storage circuit.

* * * * *